(12) United States Patent
Sadasue et al.

(10) Patent No.: US 9,153,830 B2
(45) Date of Patent: Oct. 6, 2015

(54) SEPARATION MEMBRANE FOR SOLID POLYMER FUEL CELL AND SEPARATION MEMBRANE-CATALYST ELECTRODE ASSEMBLY

(75) Inventors: Kazuyuki Sadasue, Yamaguchi (JP); Kenji Fukuta, Yamaguchi (JP); Yuki Watahiki, Yamaguchi (JP); Hiroyuki Yanagi, Yamaguchi (JP)

(73) Assignee: Tokuyama Corporation, Yamaguchi (JP)

( * ) Notice: Subject to any disclaimer, the term of this patent is extended or adjusted under 35 U.S.C. 154(b) by 388 days.

(21) Appl. No.: 12/808,205

(22) PCT Filed: Dec. 18, 2008

(86) PCT No.: PCT/JP2008/073118
§ 371 (c)(1),
(2), (4) Date: Jun. 15, 2010

(87) PCT Pub. No.: WO2009/081841
PCT Pub. Date: Jul. 2, 2009

(65) Prior Publication Data
US 2010/0291470 A1    Nov. 18, 2010

(30) Foreign Application Priority Data
Dec. 21, 2007    (JP) .................................. 2007-330327

(51) Int. Cl.
*H01M 8/10* (2006.01)
*C08J 5/22* (2006.01)
(52) U.S. Cl.
CPC ............ *H01M 8/1023* (2013.01); *C08J 5/2243* (2013.01); *H01M 8/1053* (2013.01); *H01M 8/1058* (2013.01); *C08J 2325/04* (2013.01); *H01M 2300/0082* (2013.01); *H01M 2300/0094* (2013.01); *Y02E 60/521* (2013.01)
(58) Field of Classification Search
CPC ..................................................... H01M 8/1053
USPC .......................................................... 429/483
See application file for complete search history.

(56) References Cited

U.S. PATENT DOCUMENTS

| 2003/0008137 A1* | 1/2003 | Bohm et al. ................... 428/343 |
| 2005/0042489 A1* | 2/2005 | Fukuta et al. ................... 429/30 |
| 2007/0020501 A1* | 1/2007 | Li et al. ........................... 429/33 |

FOREIGN PATENT DOCUMENTS

| EP | 1 496 561 A2 | 1/2005 |
| JP | 07-246336 A | 9/1995 |

(Continued)

OTHER PUBLICATIONS

International Search Report Dated Feb. 10, 2009.

(Continued)

*Primary Examiner* — Alison Hindenlang
(74) *Attorney, Agent, or Firm* — Norris McLaughlin & Marcus PA

(57) ABSTRACT

Disclosed is a membrane for polymer electrolyte fuel cells, which is composed of a hydrocarbon anion-ex-change resin membrane wherein an anion-exchange group is covalently bonded to a hydrocarbon resin, and an adhesive layer formed on at least one side of the hydrocarbon anion-exchange resin membrane. The membrane for polymer electrolyte fuel cells is characterized in that the adhesive layer is made of an anion-exchange resin having a Young's modulus of 1-1000 MPa.

9 Claims, 3 Drawing Sheets

(56) References Cited

FOREIGN PATENT DOCUMENTS

| | | |
|---|---|---|
| JP | 11-135137 A | 5/1999 |
| JP | 11-273695 A | 10/1999 |
| JP | 2000 331693 A | 11/2000 |
| JP | 2000-331693 A | 11/2000 |
| JP | 2002-100373 A | 4/2002 |
| JP | 2002-329500 A | 11/2002 |
| JP | 2002-367626 A | 12/2002 |
| JP | 2005-032535 A | 2/2005 |
| JP | 2005-050607 A | 2/2005 |
| WO | 2008/053770 A1 | 5/2008 |

OTHER PUBLICATIONS

Supplemental European Search Report dated Dec. 2, 2011.

* cited by examiner

SEPARATION MEMBRANE FOR SOLID POLYMER FUEL CELL AND SEPARATION MEMBRANE-CATALYST ELECTRODE ASSEMBLY

This application is a 371 application of PCT/JP2008/073118 filed Dec. 18, 2008, Which claims priority to the Japanese application 2007-330327 filed Dec. 21, 2007.

TECHNICAL FIELD

The present invention relates to a membrane for polymer electrolyte fuel cell and a membrane-catalyst electrode assembly produced using the membrane. More particularly, the present invention relates to a membrane for polymer electrolyte fuel cell, made of an anion-exchange resin membrane, a membrane-catalyst electrode assembly, and a fuel cell in which the membrane and the assembly are incorporated.

The membrane comprises an anion-exchange resin membrane and an adhesive layer formed thereon, made of an anion-exchange resin having a Young's modulus of 1 to 1,000 MPa at 25° C. Or, the present invention comprises the anion-exchange resin membrane, the adhesive layer, and an intermediate layer formed between them.

The membrane bonds well to a catalyst electrode layer via the adhesive layer. As a result, the interfacial resistance between the membrane and the catalyst electrode layer is small and output of the fuel cell produced using the membrane is high.

BACKGROUND ART

Ion exchange resin membrane is in wide use as a membrane for cell (e.g. polymer electrolyte fuel cell, redox flow cell or zinc-bromine cell), a membrane for dialysis, etc. Polymer electrolyte fuel cell uses an ion exchange resin membrane as the solid electrolyte membrane. When a fuel and an oxidant are fed continuously into this polymer electrolyte fuel cell, they react with each other, generating a chemical energy. The chemical energy generated is taken out as an electric power, and the fuel cell is one of power generation system which is clean and highly efficient.

In recent years, the polymer electrolyte fuel cell has increased its importance for uses in automobile, household and portable devices because it can be operated at low temperatures and can be produced in a small size.

The membrane-catalyst electrode assembly (hereinafter, this may be abbreviated as membrane-catalyst electrode assembly) incorporated in the polymer electrolyte fuel cell generally comprises an ion-exchange resin membrane acting as an electrolyte and diffusion electrodes bonded to each side of the membrane. Each diffusion electrode is generally constituted by a porous electrode material and a catalyst-loaded electrode bonding to the porous electrode material. When an electric power is taken out from the polymer electrolyte fuel cell, hydrogen gas or a liquid fuel (e.g. methanol) is fed into a chamber (a fuel chamber) in which one of the two diffusion electrodes is present, and an oxygen-containing gas (e.g. oxygen or air) as an oxidant is fed into a chamber (an oxidant chamber) in which the other diffusion electrode is present. When, in this state, an external load circuit is connected to the two diffusion electrodes, the fuel cell works as such and an electric power is supplied to the external load circuit.

Of polymer electrolyte fuel cells, direct liquid fuel cell utilizing methanol or the like for fuel, is evaluated highly because it uses a liquid fuel easy to handle and the fuel is inexpensive. For these reasons, the direct liquid fuel cell is expected as a power source of relatively small output which is used for portable devices.

The fundamental structure of polymer electrolyte fuel cell is shown in FIG. 1. In FIG. 1, 1a and 1b are each a partition wall of cell. The cell partition walls 1a and 1b are formed at the both sides of a solid polymer electrolyte membrane 6 made of an ion-exchange resin membrane, so as to sandwich the solid polymer electrolyte membrane 6. The solid polymer electrolyte membrane 6 functions as a membrane.

2 is a fuel passage formed in the inner wall of one cell partition wall 1a, and 3 is an oxidant gas passage formed in the inner wall of other cell partition wall 1b. 4 is a diffusion electrode of fuel chamber side, and 5 is a gas diffusion electrode of oxidant chamber side.

In using a cation-exchange electrolyte membrane as the solid polymer electrolyte membrane 6, when a liquid fuel (e.g. alcohol) or a gaseous fuel (e.g. hydrogen) is fed into a fuel chamber 7, protons (hydrogen ions) and electrons are generated by the action of the catalyst provided in the fuel chamber side diffusion electrode 4. The protons pass through the inside of the solid polymer electrolyte membrane 6 and reach an oxidant chamber 8, where the protons react with the oxygen in air or in oxygen gas, generating water. Meanwhile, the electrons generated at the fuel chamber side diffusion electrode 4 pass through an external load circuit (not shown) and are sent to the oxidant chamber side gas diffusion electrode 5. At this time, an electric energy is supplied to the external load circuit.

In the polymer electrolyte fuel cell having the above-mentioned structure, there is ordinarily used a cation-exchange resin membrane as the solid polymer electrolyte membrane 6. On the surface of the cation exchange resin membrane are formed diffusion electrodes 4 and 5. Ordinarily, hot pressing is used for formation of the diffusion electrodes 4 and 5. In this hot pressing, first there is formed, on a substrate, a diffusion electrode constituted by a porous electrode material and a catalyst electrode layer formed on one side thereof. Then, the diffusion electrode is heat-transferred from the substrate onto the surface of a cation-exchange resin membrane. The cation-exchange resin membrane and the catalyst electrode layer are made into one piece by the thermal compatibilization of the polymer electrolyte binder impregnated into the catalyst electrode layer and the cation-exchange resin consisting the cation-exchange resin membrane.

A perfluorocarbonsulfonic acid resin membrane has been used most typically as the cation-exchange resin membrane used as a membrane for fuel cell. However, the following problems are pointed out for the cation-exchange fuel cell using the perfluorocarbonsulfonic acid resin membrane.

(i) Since the field of reaction is strongly acidic, only a noble metal catalyst is usable.

(ii) The perfluorocarbonsulfonic acid resin membrane is expensive and there is a limit in cost reduction.

(iii) Since the physical strength of the resin membrane is low, it is difficult to reduce the electrical resistance of the resin membrane by making thin the resin membrane.

(iv) The resin membrane is low in water retention.

Accordingly, it is necessary to supplement water in order to maintain the proton conductivity of the resin membrane.

(v) When methanol is used as the fuel, the permeability of methanol through the resin membrane is high and methanol reaches the gas diffusion electrode of oxidant chamber side, where methanol reacts with oxygen or air at the catalyst surface of the diffusion electrode, generating an overvoltage. As a result, a reduction in output voltage takes place (the same occurs also when other liquid fuel is used).

In order to solve these problems, it is being actively investigated to use, in place of the perfluorocarbonsulfonic acid resin membrane, a hydrocarbon cation-exchange membrane. However, the above problem (i) has not been solved by using any of such hydrocarbon cation-exchange membranes.

Hence, in order to solve the above problems, particularly the problem (i), it is being investigated to use, in place of the perfluorocarbonsulfonic acid resin membrane, a hydrocarbon anion-exchange membrane; and several proposals have been made (see, for example, Patent Literatures 1 to 3). In the fuel cell using an anion-exchange membrane, the field of reaction is basic and the risk of catalyst corrosion is low. Therefore, a catalyst other than noble metal is considered to be usable.

The mechanism in which a fuel cell using an anion-exchange membrane generates an electric energy, is described below. In this case, the ionic species moving inside the solid polymer electrolyte membrane 6 differs from the ionic species of the fuel cell using a cation-exchange membrane. That is, a liquid fuel (e.g. methanol) or a gaseous fuel (e.g. hydrogen) is fed into the fuel chamber side and oxygen and water are fed into the oxidant chamber side, whereby, in the oxidant gas diffusion electrode 5, the catalyst contained in the electrode contacts with the oxygen and the water, generating hydroxide ion ($OH^-$). This hydroxide ion passes through the solid polymer electrolyte membrane 6 made of the above-mentioned hydrocarbon anion-exchange membrane and moves into the fuel chamber 7. The hydroxide ion reacts with the fuel at the fuel diffusion electrode 4, generating water. In this case, the electron generated at the fuel diffusion electrode 4 is sent to the oxidant gas diffusion electrode 5 via an external load circuit.

In the fuel cell using an anion-exchange membrane, the energy generated by the above reaction is utilized as an electric energy.

In the fuel cell using a hydrocarbon anion-exchange membrane, not only the above problem (i) but also the problems (ii) to (iii) can be greatly reduced generally.

In the direct liquid fuel cell using a liquid fuel (e.g. methanol), the problem (iv) is reduced by the water fed from a water-containing fuel. Further, it is expected that the problem (v) of methanol permeation through membrane can be considerably reduced for the following reason. That is, during the flow of electric current, hydroxide ion of large ionic diameter moves from the oxidant chamber side toward the fuel chamber side (the direction of this movement is opposite to the direction of methanol permeation). The movement of methanol is hindered by the above movement of hydroxide ion and is suppressed.

Besides, since the field of reaction is basic, the overvoltage of oxygen reduction at the diffusion electrode of oxidant chamber side can be lowered.

The polymer electrolyte fuel cell using a hydrocarbon anion-exchange membrane has such advantages. The hydrocarbon anion-exchange membrane incorporated into a fuel cell includes a membrane comprising a porous membrane (e.g. woven fabric) and a hydrocarbon type crosslinked polymer having an anion-exchange group (e.g. quaternary ammonium salt group or quaternary pyridinium salt group), filled in the porous membrane (Patent Literature 1); a membrane obtained by introducing a quaternary ammonium salt group into a hydrocarbon engineering plastic and then subjecting it to casting (Patent Literature 2); a membrane obtained by graft-polymerizing a hydrocarbon monomer having an anion-exchange group, on a substrate made of a fluorine-containing polymer; etc.

The formation of catalyst electrode layers 4 and 5 on the anion-exchange membrane (solid electrolyte membrane 6) is conducted in the same manner as in the formation on the cation-exchange membrane. That is, each catalyst electrode layer is formed using a coating fluid comprising an electrode catalyst, a binder made of an anion-exchange resin, and a solvent; then the catalyst electrode layer formed is bonded to an anion-exchange membrane by hot pressing. As the binder made of an anion-exchange resin, there is disclosed an anion-exchange resin obtained by aminating a chloromethylation product of a copolymer of aromatic polyethersulfone and aromatic polythioethersulfone (Patent Literatures 1 and 2).

The formation of catalyst electrodes can also be conducted by producing a catalyst electrode sheet made of an electrode catalyst and a polytetrafluoroethylene binder, coating thereon a binder made of an anion-exchange resin, and press-bonding the coated catalyst electrode sheet to an anion-exchange membrane to bond them to each other. As the binder, there is used a polymer obtained by treating the terminal of a perfluorocarbon polymer having a sulfonic acid group, with a diamine, for quaternization (Patent Literature 3).

Such an anion-exchange membrane has a high hardness because the membrane uses a reinforcing material or the resin constituting the anion-exchange membrane has a crosslinked structure so that the membrane can suppress the permeation of fuel or can give a mechanical strength. Or, the anion-exchange membrane uses a resin material of relatively high hardness (e.g. engineering plastic) for the same purpose. Further, as the binder made of an anion-exchange resin, used in formation of catalyst electrode layer, an engineering plastic of relatively high hardness is used. As the binder made of an anion-exchange resin, there is also used a resin whose main structure is a fluorocarbon resin low in compatibility with hydrocarbon anion-exchange membrane.

For these reasons, the adhesivity between the catalyst electrode layers 4 and 5 and the anion-exchange resin membrane is inferior and the adhesion at their interface tends to be poor. Consequently, the resistance at the interface is high. Further, the interface between the catalyst electrode layer and the anion-exchange resin membrane is exposed to a liquid fuel when used in a fuel cell. As a result, the adhesion strength at their interface tends to decrease. Further, each catalyst electrode layer and the anion-exchange resin membrane differ in chemical structure, composition, etc. and accordingly differ in the degree of swelling in liquid fuel. Therefore, poor adhesion tends to appear at the interface and peeling occurs ultimately between the anion-exchange membrane and the catalyst electrode layer.

In order to enhance the bondability between the hydrocarbon anion-exchange membrane and the catalyst electrode layer, there is a proposal of using, as the binder for catalyst electrode layer, an anion-exchange resin in which an anion-exchange group is introduced into a hydrocarbon polymer elastomer (Patent Literature 4). This literature discloses only a method for bonding, to an anion-exchange membrane, a catalyst electrode layer formed using the above-mentioned anion-exchange resin and an electrode catalyst, by thermal pressing, to bond them to each other. Their bondability, however, is not sufficient.

Patent Literature 1: JP-A-1999-135137
Patent Literature 2: JP-A-1999-273695
Patent Literature 3: JP-A-2000-331693
Patent Literature 4: JP-A-2002-367626

DISCLOSURE OF THE INVENTION

Task to be Achieved by the Invention

The present inventors made a study in order to solve the problem of peeling between anion-exchange resin membrane and catalyst electrode layer and resultant reduction in hydroxide ion conductivity between them. The study by the present inventors revealed that, when the anion-exchange capacity was increased in order to enhance the hydroxide ion conductivity, introduction of crosslinked structure into anion-exchange resin membrane or incorporating of anion-exchange resin and substrate (as a reinforcing material) could allow the anion-exchange resin membrane to exhibit its function stably in water or an organic liquid fuel and further could achieve higher non-permeability of fuel or higher mechanical strength of membrane.

However, as the properties of anion-exchange resin membrane were enhanced by the above techniques, the hardness of anion-exchange resin membrane increased. Consequently, the peeling between anion-exchange resin membrane and catalyst electrode layer took place more easily.

Hence, the aim of the present invention is to solve the above problem. That is, the present invention has a task of providing a membrane for polymer electrolyte fuel cell which can suppress the peeling between anion-exchange resin membrane and catalyst electrode layer, can operate stably over a long period, and can show high hydroxide ion conductivity between them; and a membrane-electrode assembly produced using the membrane.

Means for Achieving the Task

The present inventors made a study and thought of an idea of using, between the anion-exchange resin membrane and the catalyst electrode layer, an adhesive layer made of an anion-exchange resin which is highly flexible, has elasticity and has an anion-exchange group. It was found that, by using this adhesive layer between them, reliable bonding was made possible between a catalyst electrode layer and a highly crosslinked anion-exchange resin membrane having high hydroxide ion conductivity, high suppressability for liquid fuel permeation and high mechanical strength or an anion-exchange resin membrane of high hardness, and that the problem such as peeling between anion-exchange resin membrane and catalyst electrode layer could be solved.

It was further found that, by using an adhesive layer made of the above-mentioned flexible anion-exchange resin, the hydroxide ion conductivity at the interface between the anion-exchange resin membrane and the catalyst electrode layer could be enhanced greatly. The reason for the great enhancement of hydroxide ion conductivity is now under examination. The present inventors consider that the catalyst electrode layer has relatively large surface unevenness because the conductive carbon, etc. supporting a catalyst protrude from the surface of catalyst layer. In this case, the adhesive layer made of an anion-exchange resin is flexible and accordingly is adhered so as to fit the surface unevenness of the catalyst electrode layer, at the interface of the catalyst electrode layer. Consequently, sufficient contact is presumed to be obtained between the anion-exchange resin member and the catalyst electrode layer.

When there is further used, between the anion-exchange resin membrane and the adhesive layer, an intermediate layer having a polarity opposite to their polarity, ionic bonding takes place at the respective interfaces, whereby a higher bonding strength can be obtained between the anion-exchange resin membrane and the catalyst electrode layer. The present invention has been completed based on the above findings.

The present invention is as described below.

[1] A membrane for polymer electrolyte fuel cell, which comprises
a hydrocarbon anion-exchange resin membrane wherein an anion-exchange group is covalently bonded to a hydrocarbon resin, and
an adhesive layer formed on at least one side of the hydrocarbon anion-exchange resin membrane,
wherein the adhesive layer is made of an anion-exchange resin having a Young's modulus of 1 to 1,000 MPa.

[2] The membrane for polymer electrolyte fuel cell according to [1], wherein the adhesive layer has a solubility of less than 1% by mass in water of 20° C.

[3] The membrane for direct liquid fuel cell according to [1], wherein the adhesive layer has a solubility of less than 1% by mass in methanol and ethanol of 20° C.

[4] The membrane for polymer electrolyte fuel cell according to [1], wherein the adhesive layer is made of a hydrocarbon anion-exchange resin in which an anion-exchange group is covalently bonded to a hydrocarbon resin.

[5] The membrane for polymer electrolyte fuel cell according to [1], wherein the adhesive layer is made of a styrene-based, anion-exchange resin in which an anion-exchange group is covalently bonded to a styrene-based elastomer.

[6] The membrane for polymer electrolyte fuel cell according to [1], wherein the styrene-based elastomer is a polystyrene-polyalkylene-polystyrene triblock copolymer.

[7] The membrane for polymer electrolyte fuel cell according to [1], wherein the hydrocarbon anion-exchange resin membrane in which an anion-exchange group is covalently bonded to a hydrocarbon resin, comprises a porous membrane and a hydrocarbon anion-exchange resin filled in the pores of the porous membrane.

[8] The membrane for polymer electrolyte fuel cell according to any one of [1] to [7], wherein an intermediate layer made of a cation-exchange resin is present between the hydrocarbon anion-exchange resin membrane and the adhesive layer.

[9] A membrane-catalyst electrode assembly which is obtained by forming a catalyst electrode layer on at least one side of the membrane for polymer electrolyte fuel cell according to [1].

[10] A membrane-catalyst electrode assembly which is obtained by forming a catalyst electrode layer on at least one side of the membrane for polymer electrolyte fuel cell according to [8].

[11] A polymer electrolyte fuel cell in which the membrane-catalyst electrode assembly according to [9] is incorporated.

[12] A polymer electrolyte fuel cell in which the membrane-catalyst electrode assembly according to [10] is incorporated.

Effect of the Invention

The membrane of the present invention is a membrane for polymer electrolyte fuel cell, which has high hydroxide ion conductivity, yet has high non-permeability to fuel, particularly to liquid fuel, stability in water or liquid fuel, and high mechanical strength. Moreover, the membrane of the present invention is superior in bondability to catalyst electrode layer. As a result, the present membrane has high hydroxide ion conductivity at the interface with catalyst electrode layer and can maintain such high hydroxide ion conductivity over a long period.

The polymer electrolyte fuel cell using the membrane of the present invention can give a high cell output for long time owing to the above-mentioned excellent properties of membrane.

EXPLANATION OF NUMERICAL SYMBOLS 1a and 1b are each a cell partition wall; 2 is a fuel passage; 3 is an oxidant gas passage; 4 is a diffusion electrode at fuel chamber side; 5 is a gas diffusion electrode at oxidant chamber side; 6 is a solid polymer electrolyte membrane (an anion-exchange membrane); 7 is a fuel chamber; and 8 is an oxidant chamber.

BEST MODE FOR CARRYING OUT THE INVENTION (First Embodiment of Membrane)

Figure 2:
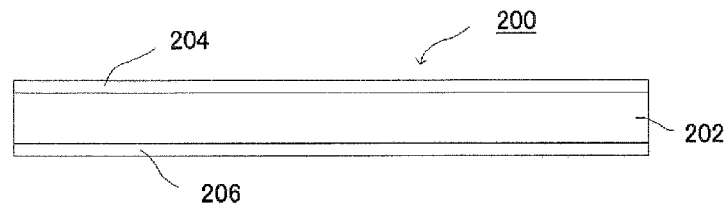
FIG. 2 is a conceptual drawing of a constitution of the first embodiment of the hydrocarbon anion-exchange resin membrane of the present invention.

In FIG. 2 is shown a constitution of the membrane for polymer electrolyte fuel cell, of the first embodiment of the present invention (hereinafter, this membrane may be referred to simply as membrane for cell). In FIG. 2, 200 is a membrane for polymer electrolyte fuel cell, wherein adhesive layers 204 and 206 are formed on both sides of a hydrocarbon anion-exchange resin membrane 202.

Figure 3:
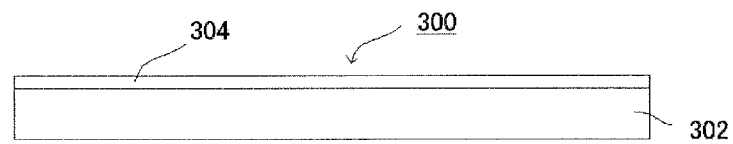
FIG. 3 is a conceptual drawing of other constitution of the first embodiment of the hydrocarbon anion-exchange resin membrane of the present invention.

In FIG. 3 is shown other constitution of the membrane for polymer electrolyte fuel cell, of the present invention. In FIG. 3, 300 is a membrane for fuel cell, wherein an adhesive layer 304 is formed only on one side of a hydrocarbon anion-exchange resin membrane 302.

Hydrocarbon Anion-Exchange Resin Membrane

As the hydrocarbon anion-exchange resin membranes 202 and 302, any known hydrocarbon anion-exchange resin membrane can be used with no restriction. As the anion-exchange group, there can be mentioned, for example, primary to tertiary amino groups, quaternary ammonium salt group, pyridyl group, imidazole group and quaternary pyridinium salt group. Quaternary ammonium salt group and quaternary pyridinium salt group, which are each a strongly basic group, are preferred.

The ion-exchange resin constituting the hydrocarbon anion-exchange resin membrane is made of a hydrocarbon polymer to which an anion-exchange group is bonded covalently. This anion-exchange resin is generally hard as compared with fluorine-based ion-exchange resins. As the anion-exchange resin, there can be mentioned, for example, an anion-exchange resin in which an anion-exchange group is introduced into a polystyrene type material and an anion-exchange resin in which a desired functional group is as necessary introduced into an engineering plastic material typified by, for example, polysulfone, polyetherketone, polyetheretherketone or polybenzimidazole type polymer.

As the anion-exchange resin used particularly in fuel cells, there is preferred an anion-exchange resin having a polymer structure in which a crosslinked structure is introduced by covalent bonding, for the necessity of being insoluble in liquid fuel or water and of low fuel permeability. Such an anion-exchange resin has a crosslinked structure as mentioned above and therefore is hard.

As the effective method for suppressing fuel permeability, there are generally the above-mentioned method of introducing a crosslinked structure by covalent bonding and further a method of forming, in an ion exchange resin membrane, a crosslinked structure based on an ionic complex between cationic functional group and anionic functional group. An anion-exchange resin having a cross-liked structure based on an ionic complex, is hard as well, similarly to an anion-exchange resin having a crosslinked structure by covalent bonding. Accordingly, an anion-exchange resin in which a crosslinked structure based on an ionic complex is formed in an anion-change resin having a crosslinked structure by covalent bonding, is an even harder resin.

As the hydrocarbon anion-exchange resin, there is preferred one in which all the main chain and side chain, other than the anion-exchange group is constituted by hydrocarbon; however, there is also included, besides the above, an anion-exchange resin in which the most portion of main chain and side chain is formed by carbon and hydrogen. The hydrocarbon polymer may have, between the carbon-carbon linkages constituting the main chain and the side chain, a bond such as ether bond, ester bond, amide bond, siloxane bond or the like. In this case, the hydrocarbon polymer contains a small amount of atoms present in the bond, such as oxygen, nitrogen, silicon, sulfur, boron, phosphorus or the like. The amount of the atom is 40 mol % or less, preferably 10 mol % or less.

The group other than the anion-exchange group, which may be bonded to the main chain and the side chain, may be, besides hydrogen, a small amount of a halogen atom (e.g. chlorine, bromine, fluorine or iodine) or other substituent group. The amount of such an atom or substituent group is preferably 40 mol % or less relative to the hydrogen, more preferably 10 mol % or less.

As the method for forming such a hydrocarbon anion-exchange resin in a membrane shape, there is, for example, a method of subjecting the anion-exchange resin to casting. There is also a method of using a substrate (also referred to as reinforcing material). The method of using a substrate is preferred because a higher mechanical strength and higher dimensional stability are obtained and moreover flexibility is obtained.

As the substrate, there can be used any substrate known as the substrate for ion-exchange resin membrane. Specifically, a porous film, a nonwoven paper, a woven fabric, a nonwoven fabric, a paper, an inorganic membrane, etc. can be used with no restriction. As the material for the substrate, there is mentioned, for example, a thermoplastic resin composition, a thermosetting resin composition, an inorganic material, or a mixture thereof.

Of these substrates, a thermoplastic resin composition is preferred because it is easy to produce and has a high adhesion strength to hydrocarbon anion-exchange resin. As the thermoplastic resin composition, there can be mentioned, for example, a polyolefin resin obtained by homopolymerization or copolymerization of α-olefins such as ethylene, propylene, 1-butene, 1-pentene, 1-hexene, 3-methyl-1-butene, 4-methyl-1-pentene, 5-methyl-1-heptene and the like; a vinyl chloride-based resin such as polyvinyl chloride, vinyl chloride-vinyl acetate copolymer, vinyl chloride-vinylidene chloride copolymer, vinyl chloride-olefin copolymer or the like; a fluorine resin such as polytetrafluoroethylene, polychlorotrifluoroethylene, polyvinylidene fluoride, tetrafluoroethylene-hexafluoropropylene copolymer, tetrafluoroethylene-perfluoroalkyl vinyl ether copolymer, tetrafluoroethylene-ethylene copolymer or the like; a polyamide resin such as nylon 6, nylon 66 or the like; and a polyimide resin. Of these resins, a polyolefin resin is used preferably because it is superior in mechanical strength, chemical stability and chemical resistance and have good compatibility particularly with hydrocarbon anion-exchange resins. As the polyolefin resin, a polyethylene resin or a polypropylene resin is more preferred and a polyethylene resin is most preferred.

As the substrate, there is preferred a porous film made of a polyolefin resin because it has a smooth surface that it has good adhesivity to catalyst electrode layer and is superior in strength, and particularly preferred is a porous film made of a polyethylene resin.

In such a porous film used as the substrate for ion exchange resin membrane, its average pore diameter is preferably 0.005 to 5.0 µm, more preferably 0.01 to 2.0 µm, most preferably 0.015 to 0.4 µm. The anion-exchange resin membrane obtained by using a substrate having such a pore diameter, is high in conductivity as well as in mechanical strength. The porosity of polyolefin resin-made porous membrane is preferably 20 to 95%, more preferably 30 to 90%, most preferably 30 to 65%, for the same reason as in the average pore diameter. The air permeability (JIS P 8117) is preferably 1,500 seconds or less, particularly preferably 1,000 seconds or less. The thickness of the porous membrane is preferably 3 to 200 µm, more preferably 3 to 40 µm, particularly preferably 8 to 20 µm. By using a substrate having such a thickness, the anion-exchange resin membrane obtained is thin and has a sufficient strength.

The above porous film can be obtained by a method described in JP-A-1997-216964, JP-A-1997-235399, JPA-2002-338721 or the like. Or, it can be obtained as a commercial product such as "Hipore" produced by Asahi Chemical Industry Co., Ltd., "U-pore" produced by Ube Industries, Ltd., "Setera" produced by Tonen Tapils Co., Ltd., "Excelpor" produced by Nitto Denko Corporation, or the like.

The hydrocarbon anion-exchange resin membrane used in the present invention may contain other components such as plasticizer, inorganic filler and the like as long as the effects of the present invention are not impaired thereby.

The hydrocarbon anion-exchange resin membrane used in the present invention may be produced by any method. In general, however, it is produced preferably by the following method.

First, a monomers composition containing a polymerizable monomer which has an anion-exchange group or into which an anion-exchange group can be introduced, and an at least bifunctional crosslinkable polymerizable monomer, is infiltrated into the pores of the above-mentioned substrate. Then, the monomers composition is polymerized. Thereafter, as necessary, an ion exchange group is introduced into the polymer obtained.

In the monomers composition, as the polymerizable monomer into which an anion-exchange group can be introduced, there can be specifically mentioned, for example, mono-functional polymerizable monomers such as styrene, α-methylstyrene, vinyltoluene, 2,4-dimethylstyrene, p-tert-butylstyrene, α-halogenated styrene, chloromethylstyrene, vinylnaphthalene, vinylpyridine, vinylimidazole, other vinyl compounds, and the like.

As the polymerizable monomer having an anion-exchange group, there can be mentioned, for example, amine monomers such as vinylbenzyltrimethylamine, vinylbenzyltriethylamine and the like, nitrogen-containing heterocyclic monomers such as vinylpyridine, vinylimidazole and the like, and salts and esters thereof.

Of these monomers, preferred are mono-functional aromatic vinyl compounds such as styrene, α-methylstyrene, vinyltoluene, 2,4-dimethylstyrene, p-tert-butylstyrene, α-halogenated styrene, chloromethylstyrene, vinylnaphthalene and the like, and nitrogen-containing compounds such as vinyl pyridine and the like, because a strongly basic anion-exchange group can be easily introduced into them. In particular, chloromethylstyrene and vinylpyridine are most preferred because the anion-exchange membrane obtained therewith can have a high ion-exchange group density.

As the polyfunctional crosslinkable polymerizable monomer having at least bifunctional groups, a bifunctional or trifunctional monomer is used generally. Specifically, there can be mentioned polyfunctional aromatic vinyl compounds such as divinylbenzene, divinybiphenyl, trivinylbenzene and the like; polyfunctional (meth)acrylic acid derivatives such as trimethylolmethane trimethacrylate, methylenebisacrylamide, hexamethylenedimethacrylamide and the like; other polyfunctional polymerizable monomers such as butadiene, chloroprene, divinylsulfone and the like; and so forth. Of these crosslinkable polymerizable monomers, preferred are polyfunctional aromatic vinyl compounds such as divinylbenzene, divinylbiphenyl, trivinylbenzene and the like.

In the polymerizable composition, as to the content of the crosslinkable polymerizable monomer, there is no particular restriction. However, the content is preferably 0.5 to 40 mass %, more preferably 1 to 25 mass % of the total amount of the polymerizable monomers contained in the polymerizable composition. When the content of the crosslinkable polymerizable monomer is controlled in the above range, the anion-exchange resin membrane obtained is low in liquid fuel permeability, swells hardly, and is low in electric resistance.

In the monomers composition, a polymerization initiator is preferably contained in order to polymerize the polymerizable monomers. As the polymerization initiator, any polymerization initiator can be used with no particular restriction as long as it can polymerize the polymerizable monomers. As specific examples of the polymerization initiator, there can be mentioned organic peroxides such as octanoyl peroxide, lauroyl peroxide, tert-butyl peroxy-2-ethylhexanoate, benzoyl peroxide, tert-butyl peroxyisobutyrate, tert-butyl peroxylaurate, tert-hexyl peroxybenzoate, di-tert-butyl peroxide and the like. The addition amount of the polymerization initiator may be a known amount used in polymerization of polymerizable monomers. In general, the amount is 0.01 to 10 parts by mass per 100 parts by mass of the polymerizable monomers.

The monomers composition may contain a solvent as necessary, and may further contain known additives such as plasticizer, organic or inorganic filler and the like. Addition of, in particular, non-electroconductive particles (e.g. lamellar silicate) whose lengthwise diameter average of primary particles is at least 0.1 time the average pore diameter of substrate and is 50 µm or less (these particles are described in JP-A-2004-217921, etc,) is preferred for enhancement of fuel non-permeability into anion-exchange resin membrane.

In producing the anion-exchange resin membrane, the above-mentioned monomers composition is contacted with a substrate to fill the monomers composition in the pores of the substrate. As the method for the contact, there can be mentioned, for example, a method of coating or spraying the monomers composition on the substrate, or immersing the substrate in the monomers composition. The method by immersion is preferred particularly because it is easy to produce the membrane. The time of immersion differs depending upon the kind of substrate or the formulation of monomers composition but, in general, it is 0.1 second to ten-odd minutes.

In polymerizing the monomers composition filled in the pores of the substrate, a known polymerization method can be used with no restriction. Generally, thermal polymerization is conducted using a polymerization initiator composed of the above-mentioned peroxide. This method is preferred because it is easy to operate and enables relatively uniform polymerization. In the polymerization, in order to prevent the hindrance for polymerization by oxygen and also obtain surface smoothness, it is more preferred to cover a substrate into which the monomers composition has been infiltrated, with a film (e.g. a polyester film) and then conduct polymerization. By covering the substrate with a film, the excessive portion of the monomers composition can be removed from the substrate; as a result, a thin uniform anion-exchange resin membrane can be obtained.

In using the above thermal polymerization, there is no particular restriction as to the polymerization temperature and a known temperature condition can be selected appropriately. The temperature is generally 50 to 150° C., preferably 60 to 120° C. When the monomers composition contains a solvent, the solvent may be removed prior to the polymerization.

When the polymerizable monomer of the monomers composition has an anion-exchange group, the membrane-shaped polymer obtained by polymerizing the monomers composition filled in the pores of the substrate can be used as the hydrocarbon anion-exchange resin membrane used in the present invention without conducting any treatment.

Meanwhile, when the membrane-shaped polymer is obtained by using a polymerizable monomer into which an anion-exchange group can be introduced, an anion-exchange group is introduced into the membrane-shaped polymer. The method for introducing the anion-exchange group is not particularly restricted and a known method such as amination, alkylation or the like can be employed appropriately.

For example, when chloromethylstyrene is used as the mono-functional polymerizable monomer, the membrane-shaped polymer obtained is contacted with an amino compound such as trimethylamine or the like, whereby the polymer can be converted to an anion-exchange resin membrane having a quaternary ammonium salt group. Also, when vinylpyridine is used as the mono-functional polymerizable monomer, the membrane-shaped polymer is contacted with an alkyl halide such as methyl iodide or the like, whereby the polymer can be converted to an anion-exchange resin membrane having a quaternary pyridinium salt group.

In producing an anion-exchange resin membrane using a mono-functional polymerizable monomer having an anion-exchange group, the content of the anion-exchange group in the resin membrane may be made even higher by further introducing an anion-exchange group into the produced anion-exchange resin membrane.

Incidentally, in the anion-exchange resin membrane obtained by any of the above-mentioned methods, it is preferred to subject the counter ion of the anion-exchange group to ion-exchange into hydroxide ion prior to the formation of an adhesive layer or an intermediate layer (both described later). There is no particular restriction as to the method of the ion exchange, and there can be employed a known method, for example, a method of immersing the anion-exchange resin membrane in an aqueous solution of sodium hydroxide or potassium hydroxide.

The present inventors made a study on the structures and properties of anion-exchange resin membrane and anion-exchange resin. As a result, the following matter was found. That is, carbon dioxide in the air is absorbed by an anion-exchange membrane or anion-exchange resin wherein the counter-ionic species is hydroxide ion (a hydroxide ion type anion-exchange membrane or anion-exchange resin). The absorbed carbon dioxide reacts quickly with the hydroxide ion (counter-ionic species) and changes into carbonate ion, and becomes a counter ion of anion-exchange group. This carbonate ion changes into bicarbonate ion. However, during the power generation of fuel cell, hydroxide ion is formed by the catalytic reaction of fuel cell. The carbonate ion and/or the bicarbonate ion (which is counter ion) is replaced (ion-exchanged) by the hydroxide ion formed. As a result, the carbonate ion and/or the bicarbonate ion is released outside as carbon dioxide gas. Therefore, even when, in a fuel cell, the counter-ionic species (hydroxide ion) of anion-exchange membrane or resin has been partly or wholly replaced by carbonate ion and/or bicarbonate ion, the counter ion becomes hydroxide ion, in the power generation of fuel cell; accordingly, the fuel cell is usable as such.

The hydrocarbon anion-exchange resin membrane obtained by the above method has a membrane resistance of ordinarily 0.005 to $1.5\Omega \cdot cm^2$, preferably 0.01 to $0.8\Omega \cdot cm^2$, more preferably 0.01 to $0.5\Omega \cdot cm^2$, in a 0.5 mol/L aqueous sodium chloride solution although the membrane resistance differs depending upon the kinds of monomers composition, anion-exchange group and substrate used. It is practically impossible to obtain a membrane resistance of less than $0.005\Omega \cdot cm^2$. A membrane resistance of more than $1.5\Omega \cdot cm^2$ results in inferior power generation efficiency, and such a membrane is disadvantageous for fuel cell.

In order to control the membrane resistance of the hydrocarbon anion-exchange resin membrane in the above range, the anion-exchange capacity of the hydrocarbon anion-exchange resin membrane is controlled in a range of preferably 0.2 to 3.0 mmol/g, more preferably 0.5 to 2.5 mmol/g.

The water content of the hydrocarbon anion-exchange resin membrane is 7% by mass or more, preferably 10% by mass or more. The water content is generally kept at about 7 to 90% by mass when the air in itself is fed as an oxidant. In order to keep the water content in the above range, the kind of ion exchange group, ion exchange capacity and crosslinking degree of the hydrocarbon anion-exchange resin membrane are controlled. When the water content is lower than 7% by mass, the resin membrane gets dry, resulting is drop of hydroxide ion conductivity.

The thickness of the hydrocarbon anion-exchange resin membrane is preferably 3 to 200 μm, more preferably 5 to 40 μm so that the membrane can have a low membrane resistance and a mechanical strength necessary for a supporting membrane. The burst strength of the hydrocarbon anion-exchange resin membrane is preferably 0.08 to 1.0 MPa, more preferably 0.1 MPa or more. When the burst strength is less than 0.08 MPa, the membrane is insufficient in mechanical strength. As a result, cracking may appear when the hydrocarbon anion-exchange resin membrane is assembled as a membrane into a fuel cell. Further, pinholes are generated in the membrane in some cases by the ends of carbon fiber which may be protruding from the carbon paper which is ordinarily used as a gas diffusion electrode. In general, the upper limit of burst strength of membrane, achievable in production is 1.0

MPa. The burst strength is preferably 0.1 MPa or more for the stable operation of fuel cell over a long period of time.

Adhesive Layer

The adhesive layers 204, 206 and 304 are laminated on at least one side of the hydrocarbon anion-exchange resin membrane to form one piece with the exchange membrane.

The thickness of the adhesive layer is preferably 0.1 to 20 µm, more preferably 1 to 10 µm. The adhesive layer is constituted by a soft anion-exchange resin for adhesive layer, which is soft and has a Young's modulus of 1 to 1,000 (MPa) at 25° C. (hereinafter, this resin is also referred to as "resin for adhesive layer" in some cases).

The Young's modulus is measured by the following method. First, a cast film made of a soft resin for adhesive layer is produced, and the cast film is allowed to stand in an atmosphere of 25° C. and 60% RH for at least 24 hours for humidity adjustment. Then, the cast film is subjected to a test by using a tensile tester in the same atmosphere, to prepare a curve showing the stress-strain relation of the cast film. Using the inclination of the first linear part of the curve, there is calculated the Young's modulus of the resin for adhesive layer.

The Young's modulus of the resin for adhesive layer at 25° C. and 60% RH is 1 to 1,000 (MPa), preferably 3 to 300 (MPa). By forming an adhesive layer using an elastomer in this range of Young's modulus at the above conditions, there can be obtained a membrane for cell which has high hydroxide ion conductivity, high mechanical strength and sufficient non-permeability to liquid fuel under the operating conditions of fuel cell and which is stable to the peeling of catalyst electrode layer.

Here, as the resin for adhesive layer, there is preferred a resin which all the portion other than the anion-exchange group is constituted by hydrocarbon. However, the resin for adhesive layer may also be a hydrocarbon polymer in which the most portion of main chain and side chain is formed by carbon and hydrogen. The hydrocarbon polymer may have, between the carbon-carbon linkages constituting the main chain and the side chain, an ether bond, an ester bond, an amide bond, a siloxane bond or the like and may contain a small amount of an atom present in the bond, such as oxygen, nitrogen, silicon, sulfur, boron, phosphorus or the like. The amount of the atom is 40 mol % or less, preferably 10 mol % or less.

As the group other than the anion-exchange group, which may be bonded to the main chain and the side chain, there can be mentioned, besides hydrogen, a small amount of an atom (e.g. chlorine, bromine, fluorine or iodine) or other substituent group. The amount of such an atom or substituent group is preferably 40 mol % or less relative to the hydrogen atm, more preferably 10 mol % or less.

As the hydrocarbon polymer constituting the main chain of the resin for adhesive layer, there are preferred a block copolymer or random copolymer between aromatic vinyl compound and conjugated diene compound; and a block copolymer or random copolymer, which is obtained by hydrogenating the conjugated diene moiety of the block copolymer to partially or wholly saturate the double bonds in the main chain of the copolymer. These block copolymers or random copolymers are each a hydrocarbon polymer which is generically named as styrene-based elastomer. In the present invention, an anion-exchange group may be introduced into these elastomers to produce a resin for adhesive layer. As the form of the block copolymers, there are mentioned di-block copolymer, tri-block copolymer, multi-block copolymer, etc. and, of these, tri-block copolymer is preferred.

In the block copolymer or random copolymer, the content of aromatic vinyl compound unit is not particularly restricted. However, the content is preferably 5 to 70% by mass, more preferably 10 to 50% by mass. By controlling the content of aromatic vinyl compound monomer in this range, the resin after introduction of anion-exchange group has electrical properties and mechanical properties, of intended levels. The block copolymer or random copolymer obtained has an average molecular weight of preferably 5,000 to 300,000, more preferably 10,000 to 150,000.

The styrene-based elastomer can be obtained by copolymerizing an aromatic vinyl compound and a conjugated diene compound by a known polymerization method such as anionic polymerization, cationic polymerization, coordination polymerization, radical polymerization or the like. A styrene-based elastomer obtained by living anionic polymerization is preferred particularly.

When the conjugated diene moiety of the block copolymer or random copolymer is hydrogenated, the hydrogenation ratio is preferably 95% or more.

As specific examples of the styrene-based elastomer, there can be mentioned a polystyrene-polybutadiene-polystyrene tri-block copolymer (SBS), a polystyrene-polyisoprene-polystyrene tri-block copolymer (SIS), a styrene-butadiene random copolymer and a styrene-propylene random copolymer. There can also be mentioned a polystyrene-poly(ethylene-butylene)-polystyrene tri-block copolymer (SEBS) and a polystyrene-poly(ethylene-propylene)-polystyrene tri-block (SEPS) copolymer, respectively obtained by hydrogenating the SBS, the SIS, etc. There can further be mentioned a styrene-ethylene-butylene random copolymer, a styrene-ethylene random copolymer, etc.

Particularly preferred are a polystyrene-poly(ethylene-butylene)-polystyrene tri-block copolymer (SEBS) and a polystyrene-poly(ethylene-propylene)-polystyrene tri-block copolymer (SEPS) because they have flexibility and hardly cause a side reaction in the step of introduction of ion exchange group into styrene-based elastomer.

The hydrocarbon polymer constituting the elastomer is appropriately introduced an anion-exchange group by a known method. When the hydrocarbon polymer has an aromatic ring in the main chain or side chain, the introduction is preferably conducted, for example, by introducing a chloromethyl group into the aromatic ring, then aminating the introduced chloromethyl group, and further converting the aminated group to a quaternary ammonium salt group.

The anion-exchange group is converted to hydroxide ion type by ion exchange and then used.

As to the anion-exchange group bonded to the resin for adhesive layer, any anion-exchange group can be employed with no particular restriction as long as it has a positive charge and is a functional group having hydroxide ion conductivity. Specifically, there can be mentioned primary to tertiary amino groups, quaternary ammonium salt group, pyridyl group, imidazole group, quaternary pyridinium group, quaternary imidazolium salt group, etc. Quaternary ammonium salt group and quaternary pyridinium salt group are preferred particularly because they can give an adhesive layer of high hydroxide ion conductivity. These ion exchange groups may be used singly or in combination of two or more kinds. Further, co-presence of cation-exchange group and anion-exchange group is possible. In this case, the amount of the anion-exchange group needs be a majority.

The anion-exchange capacity of the resin for adhesive layer is preferably 0.1 to 5.0 mmol/g, more preferably 0.5 to 3.0 mmol/g so that the resin for adhesive layer can have good ion conductivity. When the resin for adhesive layer is not crosslinked, the anion-exchange capacity is preferably 0.5 to 2.5 mmol/g because a high ion-exchange capacity makes the resin for adhesive layer water-soluble.

In fuel cell, there is present a moisture which is necessary for power generation, or water contained in fuel. When the resin for adhesive layer is water-soluble, the resin for adhesive layer dissolves out from the fuel cell system or the bondability between anion-exchange membrane and catalyst electrode layer is low, making impossible the stable supply of electricity in some cases. Therefore, the resin for adhesive layer is preferably sparingly soluble in water. Here, "sparingly soluble in water" refers to that the saturation solubility in water of 20° C. is less than 1% by mass, preferably less than 0.8% by mass. When the solubility in water is more than the above value, the resin for adhesive layer dissolves out from the gas diffusion electrode during the power generation of fuel cell, in an amount more than allowed.

Similarly, when there is used a liquid fuel, the resin for adhesive layer is preferred to be sparingly soluble in the liquid fuel used. Methanol or ethanol is used widely as the liquid fuel. Methanol or ethanol easily dissolves the resin for adhesive layer, as compared with many other liquid fuels. Therefore, if a resin for adhesive layer is sparingly soluble in methanol and ethanol, the resin for adhesive layer can be judged to have low solubility as well in other liquid fuel systems.

"Sparingly soluble in methanol and ethanol" refers to that the saturation solubility in methanol and ethanol of 20° C. is less than 1% by mass, preferably less than 0.8% by mass. When the solubility in methanol and ethanol is more than the above value, the resin for adhesive layer dissolves out from the gas diffusion electrode during the power generation of fuel cell, in an amount more than allowed.

The resin for adhesive layer having the above properties may be other than the resin having, in the main chain, the styrene-based elastomer described above in detail, and may be selected appropriately from those known as an anion-exchange resin or may be synthesized appropriately. In the case of synthesis, the solubility of the synthesis product in organic solvents or water can be adjusted by selection of monomer(s) to be polymerized or by control of crosslinking degree, amount of cation exchange group introduced, polymerization degree of resin, etc. In general, the solubility adjustment by control of crosslinking degree is preferred. The control of crosslinking degree can be conducted by changing the addition amount of crosslinkable monomer or by making molecular design so that a polymer chain or segment of high cohesive force forms a physical crosslinking site.

The resin for adhesive layer can be produced by polymerizing or condensing a monomer having an anion-exchange group and, as necessary, a small amount of a crosslinkable monomer with adjusting the solubility of the obtained resin for adhesive layer in water, methanol and ethanol so that the solubility satisfies the above-mentioned requirements. Or, the resin for adhesive layer can be produced by polymerizing or condensing a monomer into which an anion-exchange group can be introduced and, as necessary, a small amount of a crosslinkable monomer with preferably adjusting the solubility of the obtained resin for adhesive layer in water, methanol and ethanol so that the solubility satisfies the above-mentioned requirements, to obtain a hydrocarbon polymer and then introducing an anion-exchange group into the functional group of the hydrocarbon polymer, into which an anion-exchange group is introducible.

As the monomer into which an anion-exchange group can be introduced, there can be mentioned aromatic vinyl compounds such as styrene, α-methylstyrene, chloromethylstyrene, vinylpyridine, vinylimidazole, vinylnaphthalene and the like. Of these, styrene, α-methylstyrene and chloromethylstyrene are preferred in view of the easiness of introduction of anion-exchange group.

As the monomer having an anion-exchange group, there can be mentioned, for example, amine monomers such as vinylbenzyltrimethylamine, vinylbenzyltriethylamine and the like; nitrogen-containing heterocyclic monomers such as vinylpyridine, vinylimidazole and the like; and salts and esters thereof.

As to the crosslinkable polymerizable monomer, there is no particular restriction. There can be mentioned, for example, polyfunctional vinyl compounds such as divinylbenzene, divinylsulfone, butadiene, isoprene, chloroprene, 1,3-pentadiene, 2,3-dimethyl-1,3-butadiene, divinylbiphenyl, trivinylbenzene and the like; and polyfunctional methacrylic acid derivatives such as trimethylolmethane trimethacrylate, methylenebisacrylamide, hexamethylenedimethacrylamide and the like.

When the crosslinkable polymerizable monomer is used, the use amount of the crosslinkable polymerizable monomer is, in general, preferably 0.01 to 5 parts by mass, more preferably 0.05 to 1 parts by mass relative to 100 parts by mass of the monomer having a functional group to which an anion-exchange group can be introduced, or the monomer having an anion-exchange group. When the use amount of the crosslinkable polymerizable monomer is less than 0.01 part by mass, the obtained resin for adhesive layer dissolves easily in water, methanol and ethanol. When the use amount of the crosslinkable polymerizable monomer is more than 5 parts by mass, the obtained resin is insoluble in organic solvents, making difficult the handling of the resin.

Besides the monomer having a functional group into which an anion-exchange group can be introduced, the monomer having an anion-exchange group and the crosslinkable monomer, there may be added, as necessary, other monomer copolymerizable with these monomers and a plasticizer. As the other monomer, there can be mentioned, for example, vinyl compounds such as ethylene, propylene, butylene, styrene, acrylonitrile, methylstyrene, acrolein, methyl vinyl ketone, vinylbiphenyl and the like; and conjugated diene compounds such as butadiene, isoprene, 1,3-pentadiene, 2,3-dimethyl-1,3-butadiene and the like. The use amount of the other monomer is preferably 0 to 100 parts by mass relative to 100 parts by mass of the monomer having a functional group into which an anion-exchange group can be introduced or the monomer having an anion-exchange group.

As the plasticizer, there can be mentioned, for example, dibutyl phthalate, dioctyl phthalate, dimethyl isophthalate, dibutyl adipate, triethyl citrate, acetyl tributyl citrate, and dibutyl sebacate. The use amount of the plasticizer is preferably 0 to 50 parts by mass relative to 100 parts by mass of the monomer having a functional group into which an anion-exchange group can be introduced or the monomer having an anion-exchange group.

As the method for polymerization of the monomers composition comprising the above-mentioned monomer and crosslinkable monomer, there can be used a known method such as bulk polymerization, solution polymerization, suspension polymerization, emulsion polymerization or the like. The polymerization method to be used varies depending upon, for example, the formulation of monomers composition and is determined appropriately.

For example, when the above-mentioned monomer not containing any crosslinkable monomer is polymerized to produce a resin for adhesive layer, having the above-mentioned properties, there are selected polymerization conditions capable of giving a resin having an average molecular weight of 5,000 to 1,000,000, preferably 10,000 to 200,000.

When the monomers composition is formulated so as to contain the monomer having a functional group into which an anion-exchange group can be introduced, an anion-exchange group is introduced into a resin obtained by polymerization according to the same method as described in the above-mentioned method for producing a hydrocarbon anion-exchange resin membrane. Then, the counter ion of the anion-exchange resin obtained is changed to hydroxide ion by ion exchange. Thus, the resin for adhesive layer, used in the present invention is produced.

In the present invention, the above resin for adhesive layer is used as an adhesive layer. By using this adhesive layer, the bonding strength between catalyst electrode layer and hydrocarbon anion-exchange resin membrane is enhanced strikingly. Further, the hydroxide ion conductivity at their interface is improved greatly. Furthermore, the durability of fuel cell in long-term use is improved greatly.

The adhesive layer is preferably soluble in at least one kind of organic solvents other than methanol and ethanol, for the convenience in production of the adhesive layer.

As to the solvent for the resin for adhesive layer, there is no particular restriction. The solvent may be appropriately selected depending upon the weight-average molecular weight or structure of the anion-exchange resin to be dissolved. There is preferred a polar solvent of low melting point, specifically, a polar solvent having a melting point of 20° C. or less and a dielectric constant of 15 or more. More specifically, there can be mentioned, for example, 1-propanol, 2-propanol, N-butanol, tert-amyl alcohol, methyl ethyl ketone, acetonitrile, nitromethane, dimethyl sulfoxide, N-methylpyrrolidone, N,N-dimethylformamide, N,N-dimethylacetamide and tetrahydrofuran.

When the content of the anion-exchange group covalently bonded to the resin for adhesive layer is relatively small, it is possible to use the above-mentioned polar solvent as a mixture with a non-polar solvent such as 1,2-dichloromethane, trichloroethane, toluene, xylene or the like, in order to enhance the solvency for the resin for adhesive layer. When the organic solvent used is soluble in water, the organic solvent may be used as a mixture with water as long as the solvency for the resin for adhesive layer is not impaired.

Incidentally, "soluble in organic solvent" refers to that a dried resin has a saturation solubility of 1% by mass or more, preferably 3% by mass or more at atmospheric pressure at 20° C. However, even if a resin for adhesive layer is sparingly soluble at 20° C., the resin can be used for formation of adhesive layer if the resin can be made into a solution by selecting a solvent capable of dissolving the resin by heating or pressurization, or if the resin is made into a solution by dissolving the resin in a solvent having solvency and then conducting, by a known method, a solvent replacement to change the solvent to other solvent.

In the membrane for fuel cell, of the present invention, an adhesive layer constituted by the above-mentioned resin for adhesive layer is formed on at least one side of a hydrocarbon anion-exchange resin membrane.

Formation of Adhesive Layer

As to the method for forming an adhesive layer on at least one side of a hydrocarbon anion-exchange resin, there is no particular restriction. For example, first, a solution of a resin for adhesive layer is coated on a polytetrafluoroethylene sheet and is dried to form a thin film of adhesive layer on the sheet. Then, this thin film is transferred onto a crosslinked anion-exchange resin membrane by a method such as hot pressing or the like.

There is other method of forming an adhesive layer, that is, a method of contacting a solution of a resin for adhesive layer with a hydrocarbon anion-exchange resin membrane, followed by drying. As to the concentration of the solution of a resin for adhesive layer, used in formation of an adhesive layer, there is no particular restriction; however, in general, the concentration is preferably 0.01 to 10% by mass, more preferably 0.05 to 5% by mass. As to the method for contacting the solution of a resin for adhesive layer with the hydrocarbon anion-exchange resin membrane, there is no particular restriction, either. There can be mentioned, for example, a method of coating or spraying the solution of a resin for adhesive layer on the hydrocarbon anion-exchange resin membrane, or a method of immersing the hydrocarbon anion-exchange resin membrane in the solution of a resin for adhesive layer. The method by immersion or coating is preferred because it allows for easy production. In the case of the immersion method, the immersion time is generally preferred to be 1 minute to 24 hours. In the case of the immersion method, the adhesive layer is ordinarily formed on both sides of the hydrocarbon anion-exchange resin membrane at one time.

Then, the hydrocarbon anion-exchange resin membrane contacted with the solution of a resin for adhesive layer is taken out from the solution, for drying out the solvent. There is no particular restriction as to the method for drying and the drying is conducted ordinarily at 0 to 100° C. for 1 minute to 5 hours. For sufficient drying, the drying may be conducted by blowing of hot air or the like, or under reduced pressure, or in an inert atmosphere such as argon, nitrogen or the like. In the drying, in order to avoid the non-uniform removal of solvent and consequent non-uniform adhesion amount of resin for adhesive layer, the drying is conducted preferably with a tension being applied, for example, by horizontally fixing the hydrocarbon anion-exchange resin membrane to a frame.

A method other than mentioned above can be employed for formation of an adhesive layer on a hydrocarbon anion-exchange resin membrane. For example, a solution of a resin for adhesive layer is coated on the surface of a hydrocarbon anion-exchange resin membrane, with which a catalyst electrode layer is to be contacted, followed by drying. Then, a catalyst electrode layer is bonded to the hydrocarbon anion-exchange resin membrane, whereby an adhesive layer can be formed between the solid polymer anion-exchange resin membrane and the catalyst electrode layer. However, in this case, there is a fear that the solution of a resin for adhesive layer infiltrates into the catalyst electrode layer to invite excessive coverage of resin on catalyst. This results in a reduction in area of catalytic activity. Therefore, it is preferred that the adhesive layer is formed on the hydrocarbon anion-exchange resin membrane.

Thus can be obtained a membrane for polymer electrolyte fuel cell, of the present invention, which comprises a hydrocarbon anion-exchange resin membrane and an adhesive layer formed on at least one side of the hydrocarbon anion-exchange resin membrane.

Incidentally, in the above membrane for polymer electrolyte fuel cell, of first embodiment, the counter ions of the hydrocarbon anion-exchange resin membrane and the adhesive layer are, as mentioned previously, hydroxide ion, or carbonate ion and/or bicarbonate ion obtained by partial or complete replacement of the hydroxide ion. Therefore, it is preferred that, prior to the use of the above membrane in a fuel cell, the counter ions are reliably changed to hydroxide ion type by immersing the membrane in an aqueous solution of potassium hydroxide or the like. Alternatively, both the hydrocarbon anion-exchange resin membrane and the resin for adhesive layer are produced without making them into hydroxide ion type and then the membrane obtained is immersed in an aqueous solution of potassium hydroxide or the like to convert the counter ions of the resin membrane and the resin for adhesive layer to hydroxide ion type at one time.

(Second Embodiment of Membrane)

Figure 4:
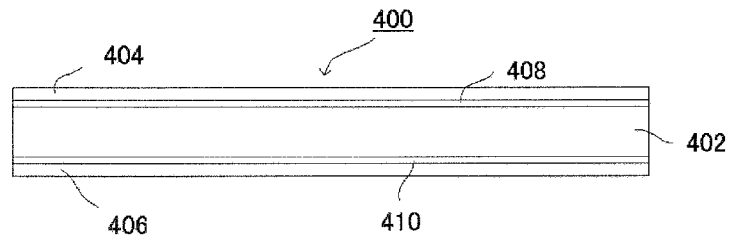
FIG. 4 is a conceptual drawing of a constitution of the second embodiment of the hydrocarbon anion-exchange resin membrane of the present invention.

In FIG. 4 is shown an example of constitution of the second embodiment of the membrane for polymer electrolyte fuel cell, of the present invention.

In FIG. 4, 400 is a membrane for polymer electrolyte fuel cell, wherein intermediate layers 408 and 410 are formed on both sides of a hydrocarbon anion-exchange resin membrane 402 and adhesive layers 404 and 406 are formed on the surfaces of intermediate layers 408 and 410. That is, the intermediate layers 408 and 410 are formed between the hydrocarbon anion-exchange resin membrane 402 and the adhesive layers 404 and 406.

Figure 5:
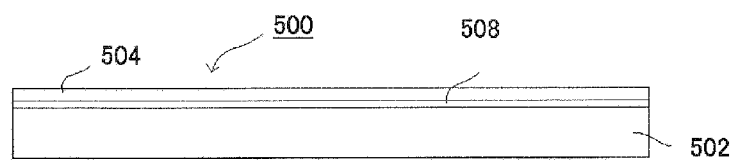
FIG. 5 is a conceptual drawing of other constitution of the second embodiment of the hydrocarbon anion-exchange resin membrane of the present invention.

FIG. 5 shows other constitution of the second embodiment of the membrane for polymer electrolyte fuel cell, of the present invention. In FIG. 5, 500 is a membrane, in which an adhesive layer 504 is formed only at one side of a hydrocarbon anion-exchange resin membrane 502 and an intermediate layer 508 is formed between the anion-exchange resin membrane 502 and the adhesive layer 504.

In the second embodiment of the membrane, the hydrocarbon anion-exchange resin membranes 402 and 502 and the adhesive layers 404, 406 and 504 are respectively the same as those described in the first embodiment of the membrane; therefore, the descriptions thereof are not made.

The intermediate layer resin constituting the intermediate layers 408, 410 and 508 is composed of a cation-exchange resin.

In the second embodiment of the membrane for polymer electrolyte fuel cell, of the present invention, an intermediate layer is formed on at least one side of a hydrocarbon anion-exchange resin membrane to be used as a solid polymer electrolyte membrane. This intermediate layer is made of a cation-exchange resin having a polarity opposite to the polarity of the anion-exchange group possessed by the anion-exchange resin membrane. On the intermediate layer is formed an adhesive layer made of a soft anion-exchange resin.

The anion-exchange group possessed by the anion-exchange resin membrane and the cation-exchange group possessed by the intermediate layer formed on the anion-exchange resin membrane are opposite to each other in polarity. Therefore, these ion-exchange groups of opposite polarities form ionic bond at their interface. As a result, the anion-exchange resin membrane and the intermediate layer are bonded more strongly owing to the adhesivity based on ordinary affinity plus the adhesivity based on the ionic bond.

Further, the adhesive layer, which is laminated on the intermediate layer having a cation-exchange group, has an anion-exchange group. Therefore, the cation exchange group of the intermediate layer and the anion-exchange group of the adhesive layer form a strong ionic bond similarly to the above case. As a result, the intermediate layer and the adhesive layer are bonded more strongly owing to the adhesivity based on ordinary affinity plus the adhesivity based on the ionic bond.

Owing to the above actions, the anion-exchange resin membrane and the adhesive layer are bonded strongly to each other via the intermediate layer, whereby the peeling between them is suppressed strongly.

As the cation-exchange resin used as the intermediate layer, there can be employed, with no particular restriction, known proton type cation-exchange resins such as perfluorocarbonsulfonic acid [e.g. Nafion (trade name) of Du Pont], hydrocarbon cation-exchange resin, and the like. Of these, hydrocarbon cation-exchange resin is preferred because it has good affinity to the hydrocarbon anion-exchange membrane.

Here, as the hydrocarbon cation-exchange resin, there is preferred one in which all the portion other than the cation-exchange group is constituted by hydrocarbon; however, there is also included, besides the above resin, one in which the most portion of the main chain and the side chain is formed by carbon and hydrogen. The hydrocarbon polymer may have, between the carbon-carbon linkages constituting the main chain and the side chain, an ether bond, an ester bond, an amide bond, a siloxane bond or the like, and the hydrocarbon polymer may contain a small amount of an atom present in the bond, such as oxygen, nitrogen, silicon, sulfur, boron, phosphorus or the like. The amount of the atom is 40 mol % or less, preferably 10 mol % or less.

The group other than cation-exchange group, which may be bonded to the main chain and the side chain, may be, besides hydrogen, a small amount of an atom (e.g. chlorine, bromine, fluorine or iodine) or other substituent group. The amount of such an atom or substituent group is preferably 40 mol % or less of the hydrogen, more preferably 10 mol % or less.

As to the cation-exchange group, there is no particular restriction. There can be mentioned, for example, sulfonic acid group, carboxylic acid group and phosphonic acid group. A weakly acidic group is preferred because it can form a strong ionic bond with anion-exchange group, and a carboxylic acid group is most preferred. These cation-exchange groups may be used singly or in combination of two or more kinds. A combination of a cation-exchange group and an anion-exchange group may be used. In this case, a cation-exchange group need be used as a majority.

As to the method for forming the intermediate layer made of a cation-exchange resin, there is no particular restriction, and any method may be employed. Specifically, there is the following method, for example.

First, a solution of a cation-exchange resin to become an intermediate layer is coated on a polytetrafluoroethylene sheet, followed by drying, to form a thin film of the cation-exchange resin on the sheet. Then, the thin film formed on the sheet is transferred onto an anion-exchange resin membrane by hot pressing or the like, to form an intermediate layer. Lastly, an adhesive layer is formed on the intermediate layer.

There is also a method of subjecting a monomer for formation of a cation-exchange resin, to plasma polymerization or the like, to deposit the resulting cation-exchange resin on an anion-exchange resin membrane.

However, the following method is preferred in view of the simplicity of production and the high adhesivity of adhesive layer to anion-exchange resin membrane.

That is, it is a method of contacting a solution of a cation-exchange resin with at least one side of the above-mentioned hydroxide ion type anion-exchange resin membrane, followed by drying, to adhere the cation-exchange resin (which becomes an intermediate layer) to the anion-exchange resin membrane.

When a cation-exchange resin (which becomes an intermediate layer) is adhered directly to a hydrocarbon anion-exchange resin membrane or to an adhesive layer, the adhesion amount of the intermediate layer can be controlled by adjusting the concentration of cation-exchange resin solution used in the adhesion step, the time of contact with the solution, the conditions for washing after adhesion, etc.

In the above method, as to the solvent used for dissolving the cation-exchange resin, there is no particular restriction.

The solvent may be appropriately selected according to the weight-average molecular weight and chemical structure of the cation-exchange resin to be dissolved. As specific examples of the usable solvent, there can be mentioned alcohols such as methanol, ethanol, 1-butanol, 2-ethoxyethanol and the like; aliphatic hydrocarbons such as hexane, cyclohexane, heptane, 1-octane and the like; fatty acids such as octanoic acid and the like; amines such as dimethyloctylamine and the like; aromatic hydrocarbons such as toluene, xylene, naphthalene and the like; ketones such as acetone, cyclohexanone, methyl ethyl ketone and the like; ethers such as dibenzyl ether, diethylene glycol dimethyl ether and the like; halogenated hydrocarbons such as methylene chloride, chloroform, ethylene bromide and the like; alcohol esters of aromatic acid or aliphatic acid, such as dimethyl phthalate, dioctyl phthalate, dimethyl isophthalate, dibutyl adipate, triethyl citrate, acetyl tributyl citrate, dibutyl sebacate and the like; alkylphosphoric acid esters; and water.

In the above adhesion method of the cation-exchange resin, the cation-exchange resin solution is contacted with the anion-exchange resin membrane subjected to ion exchange of counter ion to hydroxide ion type. There is no particular restriction as to the method for contact. There can be mentioned, for example, a method of coating or spraying a cation-exchange resin solution on an anion-exchange resin membrane, or of immersing the anion-exchange resin membrane in the cation-exchange resin solution. The contact method by coating or immersion is particularly preferred for easy production. In the case of the contact method by immersion, the immersion time differs depending upon the kinds of anion-exchange resin membrane and cation-exchange resin, the concentration of cation-exchange resin solution, and the solvent used. The immersion time is generally 1 minute to 24 hours, preferably 5 minutes to 15 hours. With the immersion of 5 minutes or more, the anion-exchange group of the anion-exchange resin membrane and the cation-exchange group of the cation-exchange resin forms an ionic bond, whereby an intermediate layer composed of the cation-exchange resin is adhered more strongly to the anion-exchange resin membrane. When the immersion time exceeds 15 hours, the cation-exchange resin adheres to the anion-exchange resin membrane in an amount more than required and in some case the membrane-electrode assembly obtained may have a high resistance.

Then, the anion-exchange resin membrane contacted with the cation-exchange resin solution is taken out from the solution and, as necessary, drying is conducted for solvent removal. When the solvent used for dissolving the cation-exchange resin is a solvent of high dielectric constant or when the solubility of the cation-exchange resin in the solvent is high, there is a case in which no sufficient ion pair is formed between the anion-exchange group possessed by the anion-exchange resin membrane and the cation-exchange group possessed by the cation-exchange resin. In such a case, formation of ion pair can be promoted by drying the anion-exchange resin membrane having contacted with the cation-exchange resin solution.

There is no particular restriction as to the method for drying, and the drying may be conducted at 0 to 100° C. for 1 minute to 5 hours depending upon the concentration of cation-exchange resin solution used and the solvent used. For sufficient drying, the drying may be conducted by blowing of hot air, or under reduced pressure, or in an inert atmosphere such as argon, nitrogen or the like. The drying is conducted preferably with a tension being applied to the anion-exchange resin membrane contacted with the cation-exchange resin solution. For applying a tension, there is, for example, a method of fixing the anion-exchange resin membrane contacted with the solution, to a frame. When no tension is applied, the removal of solvent takes place non-uniformly, which may induce the non-uniform adhesion of the cation-exchange resin to the anion-exchange resin membrane.

There is a case that the cation-exchange resin adhered to the anion-exchange resin membrane by the above-mentioned adhesion method includes a portion which forms no ion pair with the anion-exchange group of the anion-exchange resin membrane. When the cation-exchange resin contains a portion having no ion pair with the anion-exchange group of the anion-exchange resin membrane, there is a risk that the cation-exchange resin portion, when used as a membrane for fuel cell, poisons the catalyst of the catalyst electrode layer and, as a result, the output of fuel cell is reduced. Further, there is a risk that the cation-exchange resin portion increases the internal resistance of fuel cell.

In order to solve the above problems, it is preferred to wash the anion-exchange resin membrane having the cation-exchange resin thereon, with a solvent. By this washing, the cation-exchange resin portion having no ion pair with the anion-exchange group of the anion-exchange resin membrane is washed off. Meanwhile, the cation-exchange resin having ion pair is not washed off because it is strongly bonded to the anion-exchange resin membrane, by ionic bonding.

As to the solvent used for washing, there is no particular restriction as long as the solvent is capable of dissolving the cation-exchange resin adhered. The solvent may be appropriately selected depending upon the weight-average molecular weight and chemical structure of the cation-exchange resin. Specifically, there can be mentioned the same solvent as used in preparation of the cation-exchange resin solution.

There is no particular restriction as to the washing method. However, there is preferred, in view of the simple operation, a method of immersing the anion-exchange resin membrane having the cation-exchange resin adhered, in the above-mentioned solvent, to conduct washing.

There is no particular restriction as to the conditions for the washing by immersion. However, the washing is preferably conducted by immersion in a solvent at 0 to 100° C. for 10 minutes to 24 hours. For higher washing efficiency, it is preferred to use a fresh solvent every time and conduct immersion 2 to 5 times. In this case, the total immersion time is preferably 10 minutes to 10 hours.

Then, the anion-exchange resin membrane is taken out from the solvent used for the washing by immersion and is dried for solvent removal. As to the drying method, there is no particular restriction as long as the method enables substantial removal of the solvent from inside the membrane for fuel cell obtained. The drying is conducted, for example, by allowing the anion-exchange resin membrane to stand at 0 to 100° C. for 1 minute to 5 hours, depending upon the kind of the solvent. For sufficient drying, the drying may be conducted by blowing of hot air or the like to the anion-exchange resin membrane, or under reduced pressure, or in an inert atmosphere such as argon, nitrogen or the like. In the drying, there is a case that the removal of solvent takes place non-uniformly and strain appears in the anion-exchange resin membrane adhering the cation-exchange resin (hereinafter, this resin membrane may be described as "anion-exchange resin membrane with intermediate layer"). In order to prevent such strain, it is preferred to conduct the drying with a tension being applied to the membrane. The application of a tension to the anion-exchange resin membrane with an intermediate layer can be conducted, for example, by a method of fixing the anion-exchange resin membrane with an intermediate layer, to a frame.

The weight-average molecular weight of the cation-exchange resin is preferably 8,000 to 1,000,000.

When the weight-average molecular weight is 8,000 or less, the cation-exchange resin tends to infiltrate into the anion-exchange resin membrane in the step of adhering the cation-exchange resin to the anion-exchange resin membrane. As a result, there arises a reduction in the density of the cation-exchange group present on the anion-exchange resin membrane. As a result, the electrostatic attraction between the intermediate layer composed of a cation-exchange resin and the anion-exchange group of the anion-exchange resin membrane or the adhesive layer becomes weak, and the bonding strength between the membrane for fuel cell and the adhesive layer becomes insufficient. In order to make sufficient the bonding strength between them, the weight-average molecular weight of the cation-exchange resin is more preferably 20,000 or more, particularly preferably 30,000 or more, most preferably 100,000 or more.

When the weight-average molecular weight of the cation-exchange resin is more than 1,000,000, the dissolution of the cation-exchange resin is difficult in the step of adhering it to the anion-exchange membrane. In order to satisfactorily adhere the cation-exchange resin to the anion-exchange resin membrane, it is important that the cation-exchange resin is dissolved and is in a uniform solution state. For this reason, the weight-average molecular weight of the cation-exchange resin is preferably 300,000 or less, particularly preferably 250,000 or less.

As to the amount of the cation-exchange resin adhered to the anion-exchange resin membrane, there is no particular restriction. However, the adhesion amount is preferably 0.0001 to 0.5 mg/cm$^2$. When the adhesion amount of the cation-exchange resin is less than 0.0001 mg/cm$^2$, the resin amount of intermediate layer is insufficient; as a result, the bonding between the anion-exchange resin membrane and the intermediate layer is insufficient. When the adhesion amount is more than 0.5 mg/cm$^2$, the electrical resistance of the intermediate layer is high, which is not preferred. The adhesion amount of the cation-exchange resin is more preferably 0.0003 to 0.3 mg/cm$^2$, particularly preferably 0.001 to 0.1 mg/cm$^2$.

The amount of the cation-exchange resin adhered to the surface of the anion-exchange resin membrane can be determined by measurement of the surface by the following method.

When the adhesion amount is 0.001 to 0.5 mg/cm$^2$, the adhesion amount is measured by the following method.

First, on each side of a germanium optical crystal is placed an anion-exchange resin membrane having an intermediate layer formed on both sides, whereby a to-be-measured sample is prepared. Then, the incident angle of infrared radiation upon the anion-exchange resin membrane of the to-be-measured sample is set at 45°. Then, multiple reflection infrared spectrum is measured by the total reflection absorption spectrum analysis. Using the spectrum obtained, a characteristic absorption intensity based on the cation-exchange group possessed by the cation-exchange resin is determined.

Meanwhile, a known amount of a cation-exchange resin is coated on a polyethylene terephthalate film. In a manner similar to the above, absorption intensity of spectrum is determined. Using the data obtained, there is prepared a calibration curve showing a relation between the cation-exchange resin amount and the absorption intensity of spectrum. Using this calibration curve, there is calculated the adhesion amount (per unit area cm$^2$) of cation-exchange resin based on the absorption intensity of the measured sample (hereinafter, this measurement method is referred to as "ATR method").

In this ATR method, the dimension of the germanium optical crystal used is ordinarily 20 mm×50 mm×3 mm, and the area of the anion-exchange membrane used for measurement is 10 mm×45 mm.

Here, the characteristic absorption based on the cation-exchange group, when the cation-exchange resin has, for example, a sulfonic group of sulfonic acid or the like, indicates a characteristic absorption of the sulfonic group having an absorption at around 1,000 to 12,000 cm$^{-1}$ and, when the cation-exchange resin has a carbonyl group of carboxylic acid or the like, indicates a characteristic absorption of the carbonyl group having an absorption at around 1,650 to 1,760 cm$^{-1}$.

In the ATR method, the infrared radiation used for measurement does not penetrate deep into the anion-exchange resin membrane. Therefore, the amount of the cation-exchange resin present in the vicinity of the surface of the anion-exchange membrane can be measured accurately. Thus, by employing the above method, the substantial amount of the cation-exchange resin adhering to the anion-exchange resin membrane can be determined.

As described previously, when the anion-exchange resin membrane and the anion-exchange resin, whose counter ions have been ion-exchanged to hydroxide ion type, are allowed to stand in the air, the hydroxide ion changes gradually to carbonate ion and further to bicarbonate ion. When the anion-exchange resin contains carbonate ion and bicarbonate ion and when the adhesion amount of cation-exchange resin is measured by the ATR method, the characteristic absorption wavelengths of carbonate ion and bicarbonate ion overlap with the characteristic absorption wavelength of the cation-exchange resin, depending upon the kind of the cation-exchange resin (e.g. carboxylic acid group). In this case, accurate measurement is difficult. Accordingly, the measurement of the adhesion amount of cation-exchange resin by the ATR method need be conducted in a state that there is no absorption based on the carbonate ion and bicarbonate ion in the anion-exchange resin membrane. Specifically explaining, it is necessary that the counter ion of the anion-exchange resin membrane is exchanged to hydroxide ion, immediately the resulting anion-exchange resin membrane is placed in a gas (e.g. nitrogen gas free from carbon dioxide), and measurement is conducted in the gas. For this purpose, a glove box or the like can be used.

The amount of the cation-exchange resin adhering to the surface of anion-exchange resin membrane is not necessarily uniform when observed microscopically. However, the very small difference in the adhesion amount in different places has substantially no influence on the result of measurement as long as there are used a germanium optical crystal having about the above-mentioned area and the measurement sample (anion-exchange resin membrane) having about the above-mentioned size.

The adhesion amount of the cation-exchange resin may be measured by the solvent immersion method described below, in place of the ATR method. In this solvent immersion method, first, an anion-exchange resin membrane to which an intermediate layer has been adhered, is immersed in an equal-mass, mixed solution of a 0.5 mol/l aqueous hydrochloric acid solution and methanol, for long hours. By this immersion, the cation-exchange resin adhered to the anion-exchange resin membrane and the cation-exchange resin which may be infiltrated into the anion-exchange resin membrane, are dissolved out completely. Then, the amount of the cation-exchange resin dissolved into the mixed solution is quantitatively determined using liquid chromatography or the like.

The value obtained by dividing the mass of the cation-exchange resin obtained by the solvent immersion method, by the total area ($cm^2$) of the membrane is the total adhesion amount including the cation-exchange resin adhering to the membrane surface which is measured by the ATR method and the cation-exchange resin infiltrated into the membrane. It was confirmed that, when the hydrocarbon anion-exchange resin membrane is a crosslinked type and the cation-exchange resin has, as mentioned previously, a weight-average molecular weight of 5,000 to 1,000,000, the adhesion amount obtained by the solvent immersion method is ordinarily about the same as the adhesion amount obtained by the ATR method. It has been confirmed therefrom that, when there are used such an anion-exchange resin membrane and such a cation-exchange resin, the cation-exchange resin hardly infiltrates into the anion-exchange resin membrane and the most part of the resin adheres to the membrane surface.

In the ATR method, the measurement accuracy of the adhesion amount of the cation-exchange resin is low when the adhesion amount of the cation-exchange resin is less than 0.001 $mg/cm^2$. Therefore, when the amount of the cation-exchange resin adhered to the anion-exchange resin membrane is 0.0001 $mg/cm^2$ to less than 0.001 $mg/cm^2$, the amount of the cation-exchange resin adhered to the membrane can be determined by the following method which is an application method of the solvent immersion method.

First, for the anion-exchange resin membrane on which an intermediate layer made of a cation-exchange resin has been formed, the adhesion amount of the cation-exchange resin is determined by conducting the solvent immersion method. As mentioned previously, the cation-exchange resin hardly infiltrates into the anion-exchange resin membrane and the most part thereof adheres to the membrane surface. Therefore, the amount of the cation-exchange resin obtained by the solvent immersion method is extremely close to the adhesion amount adhering to the membrane surface.

In the application method of the solvent immersion method, the adhesion amount of the cation-exchange resin adhering to the anion-exchange resin membrane is determined more accurately by determining the substantial amount of the cation-exchange resin infiltrated into the anion-exchange resin membrane and subtracting this amount, according to the procedure described below.

That is, first, the anion-exchange resin membrane on which an intermediate layer has been formed, produced by the same method, is subjected to sand blasting at the surface portion, to scrape off the surface portion by 1 µm in a thickness direction. To the thus-obtained membrane whose surface portion has been scraped off, is again applied the solvent immersion method to determine the adhesion amount of the cation-exchange resin. From this amount is determined the substantial amount of the cation-exchange resin infiltrated into the anion-exchange resin membrane whose surface portion has been scraped off. Incidentally, in the ATR method, the depth of infrared radiation permeation into the anion-exchange membrane is estimated to be generally about 0.4 µm. Therefore, by scraping off the surface portion of the membrane for fuel cell by 1 µm, the portion measured in the ATR method as the cation-exchange resin amount adhering to the anion-exchange resin membrane surface can be removed.

By subtracting, from the amount of the cation-exchange resin before scraping-off of the surface portion, the amount of the cation-exchange resin after scraping-off of the surface portion, the amount of the cation-exchange resin adhering to the anion-exchange resin membrane surface can be determined accurately.

In the application method of the solvent immersion method, the area of the membrane used for immersion is also 8 cm×8 cm ordinarily. In this case as well, even if there is non-uniformity in the adhesion amount of cation-exchange resin adhering to membrane, there is substantially no scattering in measurement results as long as a membrane having about the above area is used.

Incidentally, the amount of the cation-exchange resin adhering to the solid polymer electrolyte membrane may be determined by a method other than the above method as long as the method has a correlation with the above method and can give substantially the same measurement value.

There is no particular restriction as to the adhesion form in which the cation-exchange resin constituting the intermediate layer adheres to the anion-exchange resin membrane. The intermediate layer may be formed so as to cover the whole one side of the anion-exchange resin membrane, or may be formed on part of one side of the anion-exchange resin membrane. When the intermediate layer is formed only on part of the surface of the anion-exchange resin membrane, the area of the intermediate layer is preferred to be ½ or more of one side of the anion-exchange resin membrane. When the area of the intermediate layer is ½ or more, the bonding between the anion-exchange resin membrane having the intermediate layer formed thereon and the adhesive layer is good. Naturally, when the anion exchange resin is allowed to be present on part of the anion-exchange resin membrane, the adhesion amount of the cation exchange resin is calculated based on the anion-exchange resin membrane part to which the cation-exchange resin has been adhered.

As specific examples of the hydrocarbon cation-exchange resin used for the intermediate layer in the present invention, there can be mentioned sulfonation products or alkylsulfonation products of engineering plastics such as polyetherether ketone, polysulfone, polyethersulfone, polybenzimidazole, polyvinylimidazle, polyoxazol, polyphenylene oxide, polyphenylene sulfide, polyimide and the like; sulfonation products of styrene-based elastomers such as polystyrene-poly(ethylene-butylene)-polystyrene tri-block copolymer, polystyrene-poly(ethylene-propylene)-polystyrene tri-block copolymer and the like; carboxylic acid-modified polyvinyl alcohol; polystyrenesulfonic acid; polyvinylsulfonic acid; polyacrylic acid; polymethacrylic acid; and derivatives thereof. Of these, preferred are polymers having a weakly acidic group (e.g. carboxylic acid group) because they can form a stable ionic bond.

Of the polymers having a weakly acidic group, more preferred are a polyacrylic acid and a polymethacrylic acid, both having an aliphatic main chain skeleton. These polymers have a cation-exchange group of high freedom and can form ion pair easily.

An intermediate layer is formed by the above-mentioned method and then an adhesive layer described in the first embodiment of the membrane of the present invention is bonded to the intermediate layer of the anion-exchange resin having an intermediate layer formed thereon, whereby a membrane for fuel cell of second embodiment can be obtained.

By bonding a catalyst electrode layer to both sides of the membrane for fuel cell of the present invention, there can be obtained a membrane-electrode assembly for polymer electrolyte fuel cell, of the present invention. As the catalyst electrode layer, there can be used a known catalyst electrode layer used in hydrogen fuel cell or direct liquid fuel cell, with no particular restriction.

The catalyst electrode layer comprises metal particles of catalyst and a binder resin for bonding the metal particles to each other. As the method for bonding the catalyst electrode layer and the membrane for fuel cell, there is a method of bonding a catalyst electrode layer loaded on an electrode made of a porous material, to the membrane for fuel cell of the present invention. Or, there is a method of bonding a catalyst electrode layer alone to the membrane for fuel cell and laminating thereon an electrode made of a porous material. The bonding method is described later.

As the binder resin used for the catalyst electrode layer, there can also be used an ionic group-free resin such as polytetrafluoroethylene or the like. This resin preferably contains a hydroxide ion-conductive substance. The hydroxide ion-conductive substance enhances the hydroxide ion conductivity in the catalyst electrode layer, reduces the internal resistance of fuel cell, and further increases the efficiency of catalyst utilization.

As the hydroxide ion-conductive substance, there can be used, with no restriction, a substance having an anion-exchangeable functional group whose counter ion is hydroxide ion. As such a substance, a known anion-exchange resin is used preferably. As specific examples, there can be mentioned the hydrocarbon anion-exchange resin constituting the adhesive layer of the present invention, quaternization product of polyvinylpyridine of hydroxide ion type, amination product of polychloromethylstyrene of hydroxide ion type, and polyvinylbenzyltetramethylammonium hydroxide.

As the catalyst of the catalyst electrode layer, any metal capable of promoting the oxidation reaction of fuel (e.g. hydrogen or methanol) and the reduction reaction of oxygen can be used with no particular restriction. There can be mentioned, for example, platinum, gold, silver, palladium, iridium, rhodium, ruthenium, tin, iron, cobalt, nickel, molybdenum, tungsten, vanadium and alloys thereof. Of these catalysts, preferred are platinum, ruthenium and a platinum-ruthenium alloy, all of which are superior in catalytic activity. The diameters of the metal particles of catalyst are ordinarily 0.1 to 100 nm, preferably 0.5 to 10 nm. Smaller diameters give higher catalytic action, but metal particles having diameters of less than 0.5 nm are difficult to produce. When the particle diameters are more than 100 nm, the catalytic action is insufficient. Incidentally, the catalyst may be supported on a conductive agent.

As to the conductive agent, there is no particular restriction as long as it is an electron-conductive substance. There can be mentioned, for example, carbon black (e.g. furnace black or acetylene black) and conductive carbon (e.g. active carbon or graphite). These function also as a catalyst carrier. Such a conductive agent having the above-mentioned catalyst supported thereon is preferred particularly. The conductive carbon having a catalyst loaded thereon, usable as the electrode for fuel cell is described in, for example, JP-A-2002-329500, JP-A-2002-100373, JP-A-1995-246336, etc. Many conductive agents having a catalyst loaded thereon, different in catalyst or carrier are available commercially, and they can be used per se or after applying a necessary treatment thereto.

The amount of the catalyst loaded, in the electrode catalyst layer is ordinarily 0.01 to 10 mg/cm$^2$, preferably 0.1 to 5.0 mg/cm$^2$ when the electrode catalyst layer is regarded as a sheet. When the amount of the catalyst loaded is less than 0.01 mg/cm$^2$, no sufficient catalyst action is exhibited and, when the amount is more than 10 mg/cm$^2$, the catalyst action is saturated.

By bonding the catalyst electrode layer comprising the above components and the membrane for fuel cell of the present invention, there can be obtained a membrane-electrode assembly for fuel cell. The thickness of the catalyst electrode layer is preferably 5 to 50 μm. The catalyst electrode layer is preferably formed on the surface of the adhesive layer of the membrane for fuel cell of the present invention.

Generally, the catalyst electrode layer is produced by coating a catalyst electrode paste (which is a mixture of the above-mentioned components and an organic solvent) on the surface of the adhesive layer of membrane, followed by drying. As the method for coating the catalyst electrode paste, screen printing or spraying can be mentioned, for example. The control of the loaded catalyst amount and the thickness of the catalyst electrode layer is conducted by adjusting the viscosity of the catalyst electrode paste. The adjustment of the viscosity is conducted by adjusting the amount of the organic solvent added to the catalyst electrode paste.

As the preferred method for directly forming the catalyst electrode layer on the membrane for fuel cell of the present invention, there is a method of forming, in advance, a catalyst electrode layer on a polytetrafluoroethylene or polyester film and transferring the catalyst electrode layer onto a membrane for fuel cell. The transfer of the catalyst electrode layer is conducted generally by thermocompression bonding using an apparatus capable of applying a pressure and a heat, such as hot press, roll press or the like. The pressing temperature is generally 40° C. to 200° C. The pressing pressure is ordinarily 0.5 to 20 MPa although it differs depending on the thickness and hardness of the catalyst electrode layer used.

The membrane-electrode assembly of the present invention may also be produced by loading a catalyst electrode layer on a porous electrode substrate as described above and then bonding the catalyst electrode layer to a membrane. As the porous electrode substrate, there can be mentioned, for example, carbon fiber woven cloth and carbon paper. The thickness of the electrode substrate is preferably 50 to 300 μm and the porosity thereof is preferably 50 to 90%. The membrane-electrode assembly is produced by coating the above-mentioned catalyst electrode paste on an electrode substrate, followed by drying, and then bonding the resulting catalyst electrode layer to the membrane for fuel cell of the present invention by thermocompression bonding in the same manner as above.

Figure 1:
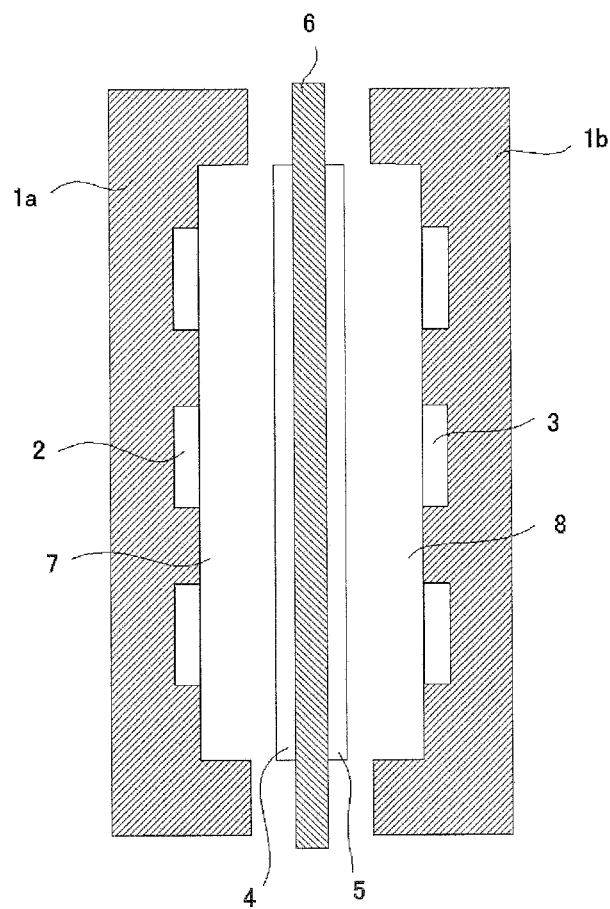
FIG. 1 is a conceptual drawing showing the basic structure of polymer electrolyte fuel cell.

The membrane-electrode assembly produced thus is used for power generation, by being incorporated into a solid electrolyte fuel cell having a basic structure shown in FIG. 1.

The polymer electrolyte fuel cell produced using the membrane of the present invention has generally a basic structure of FIG. 1. The membrane of the present invention can also be used in a direct liquid fuel cell having other known structure. As the liquid fuel, methanol, ethanol and aqueous solutions thereof are most popular. When these fuels are used, good power generation can be attained. As other fuels, there are, for example, ethylene glycol, dimethyl ether, ammonia, hydrazine and aqueous solutions thereof. With these fuels as well, the membrane of the present invention can provide excellent power generation.

When these liquid fuels are used, a basic compound may be added thereto. As the basic compound, there can be mentioned, for example, potassium hydroxide, sodium hydroxide, potassium hydrogencarbonate and sodium hydrogencarbonate. The fuel used is not limited to liquid and a gaseous fuel such as hydrogen or the like may also be used.

EXAMPLES

The present invention is described specifically below by way of Examples and Comparative Examples. However, the present invention is in no way restricted to these Examples. Incidentally, the properties of membrane for fuel cells and membrane-electrode assemblies, shown in the Examples and the Comparative Examples were measured by the following methods.

1) Ion Exchange Capacity

A membrane for fuel cell was immersed in a 0.5 mol/l aqueous NaCl solution for more than 10 hours to convert the membrane into chloride ion type. The membrane was immersed in a 0.2 mol/l aqueous $NaNO_3$ solution to convert it from the chloride ion type to nitrate ion type. The chloride ion liberated was quantitatively determined by a potentiometry (apparatus used: COMTITE-900, A PRODUCT OF HIRANUMA Sangyo K.K.) using an aqueous silver nitrate solution (A mol).

Next, the same ion-exchange membrane was immersed in a 0.5 mol/l aqueous NaCl solution for at least 4 hours. Then, the membrane was sufficiently washed with deionized water. The deionized water remaining on the surface of membrane was removed and then the wet weight (Wg) of the membrane was measured. Then, the membrane was dried at 60° C. for 5 hours under reduced pressure and measured for dry weight (Dg).

Based on these measurement data, the ion exchange capacity and water content of the membrane for fuel cell were calculated using the following formulas.

Ion exchange capacity=$A \times 1000/D$ [mmol/g (dried weight)]

Water content=$100 \times (W-D)/D$ (%)

2) Membrane Resistance

A membrane for fuel cell was placed in the center of a cell provided with two platinum black electrodes, whereby the cell was divided at the center to form a two-chambers cell. A 0.5 mol/l aqueous NaCl solution was filled at the two sides of the membrane. The resistance at 25° C. between the two electrodes was measured using an AC bridge (frequency: 1,000 cycles/sec) circuit. Then, the membrane for fuel cell was removed and the resistance between the electrodes was measured in the same manner as above. The difference between the electrode-to-electrode resistance when the membrane was provided and the electrode-to-electrode resistance when the membrane was removed, was calculated and it was taken as membrane resistance. The membrane used in the above measurement had been beforehand equilibrated by immersing it in a 0.5 mol/l aqueous sulfuric acid solution.

3) Thickness of Adhesive Layer

The thickness of a membrane for fuel cell was measured using a micrometer having a terminal system of 5 mmφ. Separately, for the hydrocarbon anion-exchange resin membrane used in production of the membrane for fuel cell, the thickness had been measured before formation of an adhesive layer on the hydrocarbon anion-exchange resin membrane. The thickness of the hydrocarbon anion-exchange resin before formation of the adhesive layer was subtracted from the thickness of the membrane for fuel cell, and the value obtained was taken as the thickness of the adhesive layer. Incidentally, with respect to the thickness of the membrane for fuel cell and the thickness of the hydrocarbon anion-exchange resin before formation of the adhesive layer, these thicknesses were each measured at 10 locations having 1 cm intervals and each average thereof was employed.

Incidentally, the thickness of the adhesive layer could also be measured by observing the section of the membrane for fuel cell using a scanning type electron microscope (SEM).

4) Young's Modulus of Resin for Adhesive Layer

A solution of a resin for adhesive layer was casted on a polytetrafluoroethylene, followed by drying, to produce a cast film of a resin for adhesive layer of 30 μm in thickness. The cast film was placed in an atmosphere of 25° C. and 60% RH for 24 hours, for humidity adjustment; then, the cast film was subjected to a tensile test in the same atmosphere using a tensile tester (EZ Tester produced by Shimadzu Corporation), to obtain a curve showing the stress-strain relation of the cast film. From the inclination of the first linear portion of the curve was determined the Young's modulus of the resin for adhesive layer.

5) Total Adhesion Amount of Intermediate Layer to the Surface of Anion-Exchange Resin Membrane (Solvent Immersion Method)

There was prepared 40 ml of an equal-mass mixed solution of methanol and a 0.5 mol/l aqueous hydrochloric acid solution. In this solution was immersed a hydrocarbon anion-exchange resin membrane (8 cm×8 cm) having an intermediate layer (a cation-exchange resin) adhered thereto, at room temperature for 16 hours, to dissolve the cation-exchange resin.

Then, the resulting solution was analyzed by liquid chromatography. The amount of the cation-exchange resin dissolved was determined using a calibration curve obtained by using a polystyrenesulfonic acid (weight-average molecular weight: 75,000) or a polyacrylic acid (weight-average molecular weight: 250,000). This resin amount was divided by the area (128 $cm^2$) of the two sides of the anion-exchange resin membrane to calculate the adhesion amount per unit area ($cm^2$) of one side of the anion-exchange resin membrane. The adhesion amount was taken as total adhesion amount of intermediate layer resin.

6) Adhesion Amount of Intermediate Layer Resin to the Surface of Anion-Exchange Resin Membrane ATR Method (Used when the Adhesion Amount was 0.001 mg/$cm^2$ or More)

On each side of a germanium optical crystal (20 mm×50 mm×3 mm) was placed an anion-exchange resin membrane (10 mm×45 mm) having a cation-exchange resin adhered thereto, to prepare a sample for measurement. Total reflection absorption spectroscopy was conducted in an atmosphere of 25° C. and 50% RH using an infrared spectrometer (Spectrum One, a product of Perkin Elmer) to measure the multiple reflection infrared spectrum of the sample at an incident angle of 45°.

Incidentally, with respect to the sample for measurement, the counter ion of the anion-exchange resin membrane having a cation-exchange resin adhered thereto was ion-exchanged to hydroxide ion and, immediately, was placed in a glove box containing an atmosphere of nitrogen gas substantially free from carbon dioxide. The adhesion amount of intermediate layer resin was measured using the above-mentioned infrared spectrometer placed in the glove box.

Meanwhile, a given amount of a polystyrenesulfonic acid (weight-average molecular weight: 75,000) or a polyacrylic acid (weight-average molecular weight: 250,000) was coated on a polyethylene terephthalate film, to prepare a standard sample. Using this standard sample, the same measurement was conducted. The absorption intensity based on the characteristic absorption of sulfonic acid group (1,177 $cm^{-1}$) or carbonyl group (1,760 $cm^{-1}$) was measured. Using these data, a calibration curve was prepared. Using this calibration curve, there was determined the adhesion amount per unit area ($cm^2$) of the intermediate layer resin at the surface of the anion-exchange resin membrane.

Application Method of Solvent Immersion Method (Used when the Adhesion Amount was Less than 0.001 mg/cm$^2$)

First, the solvent immersion method explained in the above 5) was carried out to determine the total adhesion amount of an intermediate layer resin in this state.

Then, the same anion-exchange resin membrane having an intermediate layer adhered thereto, as described above was cut into an appropriate size. An alumina oxide powder was sprayed on the side of having an intermediate layer adhered on the cut-out anion-exchange resin membrane to scrape off the surface portion of the cut-out anion-exchange resin membrane in a 1-μm thickness (including the intermediate layer). Then, using the membrane from which the surface portion had been scraped off, the solvent immersion method was conducted again and the amount of the cation-exchange resin was determined. This amount indicates the substantial amount of the intermediate layer resin which had been infiltrated into the surface portion-scraped anion-exchange resin membrane. By subtracting the total adhesion amount after scraping-off of surface portion, from the total adhesion amount before scraping-off of surface portion, the adhesion amount of the intermediate layer resin to the surface of the membrane was calculated.

Incidentally, using the hydrocarbon anion-exchange resin membranes produced in Examples 10 and 12 both described later, there was compared the amounts of the intermediate layer resin adhered to the surface of the anion-exchange resin membranes. The amounts are determined by the application method of solvent immersion method and determined by the ATR method. The adhesion amounts determined by the former method were 0.017 mg/cm$^2$ in Example 10 and 0.0015 mg/cm$^2$ in Example 12. Meanwhile, the adhesion amounts in these Examples, determined by the ATR method were completely the same as the above adhesion amounts as indicated in Table 5 and Table 6 both described later. From this result, it was confirmed that the adhesion amounts of intermediate layer resin to electrolyte membrane surface, determined by these two methods were substantially the same.

7) Bonding Property

A membrane-electrode assembly for fuel cell, right after production was subjected to a tape peeling test in accordance with the X-cut tape peeling test of JIS K 5400. After peeling of the tape, the condition of the electrode layer remaining on the anion-exchange resin membrane was observed visually and rated according to a 10-point method. The result was taken as bonding property right after production.

Also, as described later, a test for output voltage was conducted for a hydrogen fuel cell or a direct methanol fuel cell. Further, a durability test was conducted for the fuel cell, in order to confirm the power generation stability in long-term power generation. Then, the membrane-electrode assembly was taken out from the fuel cell; and the assembly (its fuel chamber side in the case of the assembly for direct methanol fuel cell) was subjected to the same tape peeling test as above to rate its bonding property.

8) Output Voltage of Direct Methanol Fuel Cell

A membrane-electrode assembly was interposed between two same carbon papers having a thickness of 200 μm and a porosity of 80%, and they were made into a fuel cell having a structure shown in FIG. 1. Then, the temperature of the fuel cell was set at 50° C. and a power generation test was conducted. A 10 mass % aqueous methanol solution was fed into the fuel chamber side at a flow rate of 1 ml/min. Air of atmospheric pressure was fed into the oxidant chamber side at a flow rate of 200 ml/min. Terminal voltages of the fuel cell at current densities of 0 A/cm$^2$ and 0.1 A/cm$^2$ were measured.

9) Output Voltage of Hydrogen Fuel Cell

A membrane-electrode assembly was interposed between two same carbon papers having a thickness of 200 μm and a porosity of 80%, and they were made into a fuel cell having a structure shown in FIG. 1. Then, the temperature of the fuel cell was set at 50° C. and a power generation test was conducted. Hydrogen and air both of 50° C. at atmospheric pressure and both humidified were fed at flow rates of 200 ml/min and 500 ml/min, respectively. Terminal voltages of the cell at current densities of 0 A/cm$^2$ and 0.2 A/cm$^2$ were measured.

10) Rating of Durability

After the above measurement of the output voltage of each fuel cell, a continuous power generation test was conducted at 50° C. and 0.2 A/cm$^2$ in the case of the hydrogen fuel cell and at 50° C. and 0.1 A/cm$^2$ in the case of the direct methanol fuel cell. The output voltage after 250 hours was measured. With this measurement value, the durability of the membrane-electrode assembly was rated.

Production Example 1

There was prepared a monomers composition consisting of 100 mass parts of chloromethylstyrene, 3 mass parts (3.5 mol % of the total polymerizable monomers) of divinylbenzene, mass parts of a polyethylene glycol diepoxide (molecular weight: 400) and 5 mass parts of tert-butyl peroxyethylhexanoate. In this monomers composition was immersed, at 25° C. for 10 minutes under atmospheric pressure, a porous membrane (thickness: 25 μm, porosity: 37%, average pore diameter: 0.03 μm) made of a polyethylene (PE, weight-average molecular weight: 250,000) to infiltrate the monomers composition into the porous membrane.

Successively, the porous membrane was taken out from the monomers composition and covered, at the both sides, with a polyester film (a peeling material) of 100 μm in thickness. Then, the covered porous membrane was heated at a nitrogen pressure of 0.3 MPa at 80° C. for 5 hours to polymerize the infiltrated monomers composition.

The membrane-shaped material obtained was immersed in an amination bath at room temperature for 16 hours to obtain a quaternary ammonium type anion-exchange membrane of chloride ion type. The amination bath contained 10 mass parts of 30 mass % triethylamine, 5 mass parts of water and 5 mass parts of acetone. The anion-exchange resin membrane obtained was immersed in a large excess of a 0.5 mol/l aqueous NaOH solution to ion-exchange the counter ion from chloride ion to hydroxide ion. Then, the membrane was washed with deionized water to obtain an anion-exchange resin membrane of hydroxide ion type.

The anion-exchange resin membrane was measured for ion exchange capacity, water content, membrane resistance and membrane thickness. The results are shown in Table 2.

Production Examples 2 to 3

Anion-exchange resin membranes were obtained in the same manner as in Production Example 1 except that the monomers composition and the porous membrane were changed to those shown in Table 1. The anion-exchange resin membranes were measured for ion exchange capacity, water content, membrane resistance and membrane thickness. The results are shown in Table 2.

Production Example 4

100 mass parts of 4-vinylpyridine, 5 mass parts (3.9 mol % in the total polymerizable monomers) of divinylbenzene and 5 mass parts of tert-butyl peroxyethylhexanoate to prepare a monomers composition. In this monomers composition was immersed, at 25° C. for 10 minutes under atmospheric pressure, a porous membrane (thickness: 25 μm, porosity: 37%, average pore diameter: 0.03 μm) made of a polyethylene (PE, weight-average molecular weight: 250,000) to infiltrate the monomers composition into the porous membrane.

The porous membrane was taken out from the monomers composition and covered, at the both sides, with a polyester film (a peeling material) of 100 μm in thickness. Then, the covered porous membrane was heated at a nitrogen pressure of 0.3 MPa at 80° C. for 5 hours to polymerize the infiltrated monomers composition. The membrane-shaped material obtained was immersed in a 1:4 (mass ratio) mixture of methyl iodide and methanol at 30° C. for 24 hours to obtain a quaternary pyridinium type anion-exchange resin membrane of iodide ion type. Then, the anion-exchange resin membrane was immersed in a large excess of a 0.5 mol/l aqueous NaOH solution to ion-exchange the counter ion from iodide ion to hydroxide ion. Then, the membrane was washed with deionized water to obtain an anion-exchange resin membrane of hydroxide ion type.

The anion-exchange resin membrane was measured for ion exchange capacity, water content, membrane resistance and membrane thickness. The results are shown in Table 2.

TABLE 1

| | | Formulation (mass parts) | | | | |
|---|---|---|---|---|---|---|
| Production Example | Porous membrane | CMS | 4VP | DVB | PO | Epoxy compound |
| 1 | A | 100 | 0 | 3 | 5 | 5 |
| 2 | A | 100 | 0 | 10 | 5 | 5 |
| 3 | B | 100 | 0 | 3 | 5 | 5 |
| 4 | A | 0 | 100 | 5 | 0 | 0 |

Porous membrane

A: A porous membrane made of a polyethylene having a weight-average molecular weight of 250,000; membrane thickness: 25 μm; average pore diameter: 0.03 μm, porosity: 37%

B: A porous membrane made of a polyethylene having a weight-average molecular weight of 200,000; membrane thickness: 9 μm; average pore diameter: 0.03 μm, porosity: 35%

CMS: Chloromethylstyrene

4VP: 4-Vinylpyridine

DVB: Divinylbenzene

PO: tert-Butyl peroxyethylhexanoate

Epoxy compound: Epolite 40 E, a product of Kyoeisha Chemical Co. Ltd.

TABLE 2

| Production Example | Ion exchange capacity (mmol/g-dried membrane) | Water content (%) | Membrane resistance ($\Omega \cdot cm^2$) | Membrane thickness (μm) |
|---|---|---|---|---|
| 1 | 1.8 | 26 | 0.30 | 28 |
| 2 | 1.5 | 20 | 1.10 | 28 |
| 3 | 1.7 | 25 | 0.11 | 10 |
| 4 | 2.1 | 30 | 0.30 | 28 |

Example 1

A solution of adhesive layer resin was coated on both sides of the anion-exchange resin membrane of Production Example 1 by screen printing. The adhesive layer resin was obtained by subjecting a {polystyrene-poly(ethylene-butylene)-polystyrene} tri-block copolymer (SEBS) to chloromethylation, converting the resulting copolymer to a quaternary ammonium type to obtain an anion-exchange resin, and ion-exchanging its counter ion to hydroxide ion. Hereinafter, this adhesive layer resin is described as quaternary ammonium type SEBS, in some cases. The properties of the adhesive layer resin are shown in Table 3. Other adhesive layer resins are abbreviated similarly.

The solution of adhesive layer resin was obtained by dissolving the quaternary ammonium type SEBS in 1-propanol by an amount of 5 mass %.

The anion-exchange resin membrane on which the solution of adhesive layer resin had been coated, was dried in an atmosphere of 25° C. for 2 hours. Thereby was obtained a membrane for fuel cell of the present invention having an adhesive layers on both sides of an anion-exchange resin membrane. The for fuel cell was measured for anion-exchange capacity, water content, membrane resistance, membrane thickness and thickness of adhesive layer. The results are shown in Table 5.

Meanwhile, a carbon black having 50 mass % of platinum loaded thereon was mixed with a solution obtained by dissolving, in an amount of 5 mass %, a quaternary ammonium type {polystyrene-poly(ethylene-propylene)-polystyrene} tri-block copolymer (SEPS) (derived to the quaternary ammonium type in the same manner as in the above-mentioned case of the quaternary ammonium type SEBS) in a mixed solvent of tetrahydrofuran/1-propanol (95:5 mass %), whereby a mixture solution was prepared. The mixture solution was coated on a polytetrafluoroethylene sheet so that the catalyst amount became 3 mg/cm$^2$. The coated sheet was dried under reduced pressure at 80° C. for 4 hours to produce a catalyst electrode layer of oxidant chamber side. Also, a catalyst electrode layer of fuel chamber side was produced in the same manner except that there was used a carbon black having 50 mass % of a platinum-ruthenium alloy catalyst (ruthenium: 50 mol %) loaded thereon.

Then, the two catalyst electrode layers were placed on both sides (one catalyst layer on one side) of the above-produced membrane for fuel cell, and they were subjected to hot pressing at 100° C. at a pressure of 5 MPa for 100 seconds, whereby a membrane-electrode assembly for direct methanol fuel cell was obtained. The membrane-electrode assembly was evaluated for bonding property. Further, using this membrane-electrode assembly for fuel cell, a direct methanol fuel cell was produced and evaluated for output voltage, durability, and bonding property after durability test. The results are shown in Table 5.

Also, a membrane-electrode assembly for hydrogen fuel cell was produced by using a catalyst electrode layer (produced in the same manner so that the platinum catalyst amount became 0.5 mg/cm$^2$) as a catalyst electrode layer of oxidant chamber side and also as a catalyst electrode layer of fuel chamber side. The membrane-electrode assembly for hydrogen fuel cell was evaluated for bonding property. Using this membrane-electrode assembly for hydrogen fuel cell, a hydrogen fuel cell was produced and evaluated for output voltage, durability, and bonding property after durability test. The results are shown in Table 6.

TABLE 3

| Adhesive layer resin | Weight-average molecular weight | Young's modulus (MPa) | Solubility in water (mass %) | Solubility in methanol (mass %) | Ion-exchange capacity (mmol/g-dried membrane) |
|---|---|---|---|---|---|
| SEBS | 30,000 | 60 | 0.06 | 0.05 | 1.5 |
| SEPS | 50,000 | 90 | 0.05 | 0.05 | 1.3 |
| ranSEB | 200,000 | 90 | 0.05 | 0.03 | 1.4 |
| PSf [1] | 20,000 | 600 | 0.07 | 0.10 | 1.2 |
| PSf [2] | 150,000 | 1,400 | 0.03 | 0.05 | 1.1 |

SEBS: Quaternary ammonium type polystyrene-poly(ethylene-butylene)-polystyrene tri-block copolymer (styrene content: 30%)
SEPS: Quaternary ammonium type polystyrene-poly(ethylene-propylene)-polystyrene tri-block copolymer (styrene content: 30%)
ranSEB: Quaternary ammonium type poly(styrene-ethylene-butylene) random copolymer (styrene content: 30%)
PSf: Polysulfone

TABLE 4

| Example | Anion-exchange membrane | Kind of adhesive layer resin | Young's modulus of adhesive layer resin (MPa) | Kind of intermediate layer resin | Weight-average molecular weight of intermediate layer resin | Concentration of intermediate layer resin solution (mass %) |
|---|---|---|---|---|---|---|
| 1 | Production Example 1 | SEBS | 60 | Not used | — | — |
| 2 | Production Example 1 | SEBS | 60 | Not used | — | — |
| 3 | Production Example 1 | SEBS | 60 | Not used | — | — |
| 4 | Production Example 1 | SEBS | 60 | Not used | — | — |
| 5 | Production Example 1 | SEPS | 90 | Not used | — | — |
| 6 | Production Example 1 | ranSEB | 90 | Not used | — | — |
| 7 | Production Example 2 | SEBS | 60 | Not used | — | — |
| 8 | Production Example 3 | SEBS | 60 | Not used | — | — |
| 9 | Production Example 4 | SEBS | 60 | Not used | — | — |
| 10 | Production Example 1 | SEBS | 60 | PAA | 250,000 | 0.2 |
| 11 | Production Example 1 | SEBS | 60 | PAA | 250,000 | 0.03 |
| 12 | Production Example 1 | SEBS | 60 | PAA | 25,000 | 0.2 |
| 13 | Production Example 4 | SEBS | 60 | PAA | 250,000 | 0.2 |
| 14 | Production Example 1 | PSf [1] | 600 | PAA | 250,000 | 0.2 |
| 15 | Production Example 1 | SEBS | 60 | PSSA | 75,000 | 0.2 |
| 16 | Production Example 1 | SEBS | 60 | Commercial product A | 150,000 | 0.2 |
| Comp. Ex. 1 | Production Example 1 | Not used | — | Not used | — | — |
| Comp. Ex. 2 | Production Example 4 | Not used | — | Not used | — | — |
| Comp. Ex. 3 | Production Example 1 | Not used | — | PAA | 250,000 | 0.2 |
| Comp. Ex. 4 | Production Example 1 | PSf [2] | 1,400 | PAA | 250,000 | 0.2 |

SEBS: Quaternary ammonium type polystyrene-poly(ethylene-butylene)-polystyrene tri-block copolymer (styrene content: 30%)
SEPS: Quaternary ammonium type polystyrene-poly(ethylene-propylene)-polystyrene tri-block copolymer (styrene content: 30%)
ranSEB: Quaternary ammonium type poly(styrene-ethylene-butylene) random copolymer (styrene content: 30%)
PSf: Polysulfone
PAA: Polyacrylic acid
PSSA: Sulfonated polystyrene
Commercial product A: Perfluorocarbonsulfonic acid

TABLE 5

| Example | Anion-exchange capacity (mmol/g-dried membrane) | Water content (%) | Membrane resistance ($\Omega \cdot cm^2$) | Membrane thickness (μm) | Adhesive layer thickness (μm) | Adhesion amount of intermediate layer ($mg/cm^2$) Surface | Adhesion amount of intermediate layer ($mg/cm^2$) Total amount | Bonding property (point) Right after production | Bonding property (point) After 250-hr power generation | Output voltage of fuel cell (V) 0 A/$cm^2$ | Output voltage of fuel cell (V) 0.1 A/$cm^2$ | Durability after 250-hr power generation (V) 0.1 A/$cm^2$ |
|---|---|---|---|---|---|---|---|---|---|---|---|---|
| 1 | 1.8 | 26 | 0.30 | 32 | 0.5 | — | — | 8 | 4 | 0.74 | 0.18 | 0.12 |
| 2 | 1.8 | 26 | 0.30 | 32 | 2 | — | — | 8 | 6 | 0.77 | 0.26 | 0.22 |
| 3 | 1.7 | 28 | 0.32 | 38 | 5 | — | — | 8 | 6 | 0.77 | 0.26 | 0.23 |
| 4 | 1.6 | 33 | 0.40 | 58 | 15 | — | — | 8 | 4 | 0.74 | 0.23 | 0.16 |
| 5 | 1.8 | 26 | 0.32 | 32 | 2 | — | — | 8 | 6 | 0.76 | 0.23 | 0.22 |
| 6 | 1.8 | 27 | 0.32 | 32 | 2 | — | — | 8 | 6 | 0.76 | 0.22 | 0.20 |
| 7 | 1.5 | 20 | 1.10 | 32 | 2 | — | — | 8 | 6 | 0.75 | 0.18 | 0.14 |
| 8 | 1.7 | 26 | 0.12 | 13 | 2 | — | — | 8 | 6 | 0.77 | 0.30 | 0.25 |

TABLE 5-continued

| Example | Anion-exchange capacity (mmol/g-dried membrane) | Water content (%) | Membrane resistance (Ω·cm²) | Membrane thickness (μm) | Adhesive layer thickness (μm) | Adhesion amount of intermediate layer (mg/cm²) Surface | Adhesion amount of intermediate layer (mg/cm²) Total amount | Bonding property (point) Right after production | Bonding property (point) After 250-hr power generation | Output voltage of fuel cell (V) 0 A/cm² | Output voltage of fuel cell (V) 0.1 A/cm² | Durability after 250-hr power generation (V) 0.1 A/cm² |
|---|---|---|---|---|---|---|---|---|---|---|---|---|
| 9 | 2.1 | 31 | 0.30 | 32 | 2 | — | — | 8 | 6 | 0.76 | 0.26 | 0.20 |
| 10 | 1.8 | 26 | 0.31 | 32 | 2 | 0.0017 | 0.0017 | 10 | 10 | 0.78 | 0.28 | 0.27 |
| 11 | 1.8 | 26 | 0.30 | 32 | 2 | 0.0006* | 0.0006* | 10 | 10 | 0.77 | 0.28 | 0.24 |
| 12 | 1.8 | 25 | 0.31 | 32 | 2 | 0.0015 | 0.0015 | 10 | 10 | 0.78 | 0.29 | 0.27 |
| 13 | 2.1 | 31 | 0.31 | 32 | 2 | 0.0020 | 0.0020 | 10 | 10 | 0.77 | 0.28 | 0.26 |
| 14 | 1.8 | 20 | 0.33 | 32 | 2 | 0.0017 | 0.0017 | 8 | 8 | 0.71 | 0.21 | 0.18 |
| 15 | 1.8 | 26 | 0.31 | 32 | 2 | 0.0022 | 0.0022 | 10 | 6 | 0.78 | 0.27 | 0.22 |
| 16 | 1.8 | 25 | 0.31 | 32 | 2 | 0.0026 | 0.0026 | 10 | 6 | 0.75 | 0.27 | 0.23 |
| Comp. Ex 1 | 1.8 | 26 | 0.30 | 28 | — | — | — | 0 | 0 | 0.65 | 0.15 | 0.03 |
| Comp. Ex 2 | 2.1 | 30 | 0.30 | 28 | — | — | — | 0 | 0 | 0.64 | 0.13 | 0.03 |
| Comp. Ex 3 | 1.8 | 26 | 0.31 | 28 | — | 0.0017 | 0.0017 | 10 | 8 | 0.66 | 0.16 | 0.13 |
| Comp. Ex 4 | 1.8 | 25 | 0.33 | 32 | 2 | 0.0020 | 0.0020 | 3 | 4 | 0.57 | 0.15 | 0.04 |

*Measured by the application method of solvent immersion method (All data other than those having a *mark were obtained by the ATR method)

TABLE 6

| Example | Anion-exchange capacity (mmol/g-dried membrane) | Water content (%) | Membrane resistance (Ω·cm²) | Membrane thickness (μm) | Adhesive layer thickness (μm-one side) | Adhesion amount of intermediate layer (mg/cm²) Surface | Adhesion amount of intermediate layer (mg/cm²) Total amount | Bonding property (point) Right after production | Bonding property (point) After 250-hr power generation | Output voltage of fuel cell (V) 0 A/cm² | Output voltage of fuel cell (V) 0.2 A/cm² | Durability after 250-hr power generation (V) 0.2 A/cm² |
|---|---|---|---|---|---|---|---|---|---|---|---|---|
| 2 | 1.8 | 26 | 0.30 | 32 | 2 | — | — | 8 | 6 | 0.97 | 0.28 | 0.23 |
| 3 | 1.7 | 28 | 0.32 | 38 | 5 | — | — | 8 | 6 | 0.98 | 0.28 | 0.24 |
| 5 | 1.8 | 26 | 0.32 | 32 | 2 | — | — | 8 | 6 | 0.95 | 0.27 | 0.23 |
| 7 | 1.5 | 20 | 1.10 | 32 | 2 | — | — | 8 | 6 | 0.95 | 0.20 | 0.16 |
| 8 | 1.7 | 26 | 0.12 | 13 | 2 | — | — | 8 | 6 | 0.97 | 0.32 | 0.28 |
| 9 | 2.1 | 31 | 0.30 | 32 | 2 | — | — | 8 | 6 | 0.95 | 0.27 | 0.23 |
| 10 | 1.8 | 26 | 0.31 | 32 | 2 | 0.0017 | 0.0017 | 10 | 10 | 0.98 | 0.31 | 0.29 |
| 13 | 2.1 | 31 | 0.31 | 32 | 2 | 0.0020 | 0.0020 | 10 | 10 | 0.97 | 0.30 | 0.27 |
| 14 | 1.8 | 20 | 0.33 | 32 | 2 | 0.0017 | 0.0017 | 10 | 8 | 0.92 | 0.23 | 0.20 |
| 15 | 1.8 | 26 | 0.31 | 32 | 2 | 0.0022 | 0.0022 | 10 | 8 | 0.98 | 0.26 | 0.23 |
| Comp. Ex 1 | 1.8 | 26 | 0.30 | 28 | — | — | — | 0 | 0 | 0.85 | 0.16 | 0.06 |
| Comp. Ex 2 | 2.1 | 30 | 0.30 | 28 | — | — | — | 0 | 0 | 0.83 | 0.15 | 0.04 |
| Comp. Ex 3 | 1.8 | 26 | 0.31 | 28 | — | 0.0017 | 0.0017 | 10 | 8 | 0.85 | 0.17 | 0.15 |
| Comp. Ex 4 | 1.8 | 25 | 0.33 | 32 | 2 | 0.0020 | 0.0020 | 8 | 4 | 0.86 | 0.19 | 0.13 |

Examples 2 to 9

Membrane for fuel cells were obtained in the same manner as in Example 1 except that there were used anion-exchange membranes and adhesive layer resins shown in Table 4 (the properties are shown in Table 3). The membrane for fuel cells were measured for anion-exchange capacity, water content, membrane resistance, membrane thickness and thickness of adhesive layer, and the results are shown in Table 5.

Then, using the membrane for fuel cells, membrane-electrode assemblies for direct methanol fuel cell were produced in the same manner as in Example 1. The membrane-electrode assemblies were evaluated for bonding property.

Further, using the membrane-electrode assemblies, direct methanol fuel cells were produced; and they were evaluated for output voltage, durability, and bonding property after durability test. The results are shown in Table 5.

As to Examples 2, 3, 5, 7, 8 and 9, there were also produced membrane-electrode assemblies for hydrogen fuel cell, and they were evaluated for bonding property. Using the membrane-electrode assemblies, hydrogen fuel cells were produced; and they were evaluated for output voltage, durability, and bonding property after durability test. The results are shown in Table 6.

Example 10

The anion-exchange membrane of Production Example 1 was immersed in a methanol solution containing 0.2 mass % of a polyacrylic acid (weight-average molecular weight: 250,000), at room temperature for 15 minutes and was dried at 25° C. for 6 hours under atmospheric pressure and then at 40° C. for 5 hours under reduced pressure. Then, the membrane was immersed in methanol at room temperature for 30 minutes. Thereafter, the methanol was changed to fresh methanol and immersion was conducted two times in total.

The membrane was dried at room temperature for 5 hours to obtain a membrane for fuel cell having an intermediate layer. To this separation for membrane for fuel cell having an intermediate layer was adhered an adhesive layer according to the method shown in Example 1, to obtain a membrane for fuel cell of the present invention. The membrane for fuel cell was evaluated for anion-exchange capacity, water content, membrane resistance, membrane thickness and adhesion amount of intermediate layer, and the results are shown in Table 5.

Next, a membrane-electrode assembly for direct methanol fuel cell was obtained in the same manner as in Example 1. The membrane-electrode assembly was evaluated for bonding property. A direct methanol fuel cell using the membrane-electrode assembly was evaluated for output voltage, durability, and bonding property after durability test. The results are shown in Table 5. There was also produced a membrane-electrode assembly for hydrogen fuel cell in the same manner as in Example 1, and was evaluated for bonding property. A hydrogen fuel cell using the membrane-electrode assembly was evaluated for output voltage, durability, and bonding property after durability test. The results are shown in Table 6.

Examples 11 to 15

Membrane for fuel cells were obtained in the same manner as in Example 10 except that the concentration of intermediate layer resin solution, the kind of intermediate layer resin and the thickness of adhesive layer were changed to those shown in Table 4. The membrane for fuel cells were measured for anion-exchange capacity, water content, membrane resistance, membrane thickness and thickness of adhesive layer. The results are shown in Table 5.

Then, membrane-electrode assemblies for direct methanol fuel cell were produced in the same manner as in Example 1. The membrane-electrode assemblies were evaluated for bonding property. Further, direct methanol fuel cells using the membrane-electrode assemblies were evaluated for output voltage, durability, and bonding property after durability test. The results are shown in Table 5. As to Examples 13, 14 and 15, there were also produced membrane-electrode assemblies for hydrogen fuel cell in the same manner as in Example 1, and they were evaluated for bonding property. Hydrogen fuel cells using the membrane-electrode assemblies were produced; and they were evaluated for output voltage, durability, and bonding property after durability test. The results are shown in Table 6.

Example 16

A membrane for fuel cell was produced in the same manner as in Example 10 except that 1-propanol was added to a perfluorocarbonsulfonic acid solution (commercial product A) to obtain a solution of intended concentration, an intermediate layer was formed using the solution, and washing was conducted using methanol. The membrane for fuel cell was measured for anion-exchange capacity, water content, membrane resistance, membrane thickness and thickness of adhesive layer. The results are shown in Tables 5 and 6.

Next, a membrane-electrode assembly for direct methanol fuel cell was obtained in the same manner as in Example 1. The membrane-electrode assembly was evaluated for bonding property. A direct methanol fuel cell using the membrane-electrode assembly was evaluated for output voltage, durability, and bonding property after durability test. The results are shown in Table 5. There was also produced a membrane-electrode assembly for hydrogen fuel cell in the same manner as in Example 1, and was evaluated for bonding property. A hydrogen fuel cell using the membrane-electrode assembly was evaluated for output voltage, durability, and bonding property after durability test. The results are shown in Table 6.

Comparative Examples 1 to 2

Membrane-electrode assemblies for direct methanol fuel cell were obtained in the same manner as in Example 1, using the anion-exchange membrane of Production Example 1 or 4 per se as a membrane for fuel cell. The membrane-electrode assemblies were evaluated for bonding property. Direct methanol fuel cells using the membrane-electrode assemblies were evaluated for output voltage, durability, and bonding property after durability test. The results are shown in Table 5. There were also produced membrane-electrode assemblies for hydrogen fuel cell, in the same manner as in Example 1, and were evaluated for bonding property. Hydrogen fuel cells using the membrane-electrode assemblies were evaluated for output voltage, durability, and bonding property after durability test. The results are shown in Table 6.

Comparative Example 3

A membrane for fuel cell was produced by forming only an intermediate layer on the anion-exchange membrane of Production Example 10. The membrane for fuel cell was measured for anion-exchange capacity, water content, membrane resistance, membrane thickness and thickness of adhesive layer. The results are shown in Table 5.

Next, a membrane-electrode assembly for direct methanol fuel cell was obtained in the same manner as in Example 1. The membrane-electrode assembly was evaluated for bonding property. A direct methanol fuel cell using the membrane-electrode assembly was evaluated for output voltage, durability, and bonding property after durability test. The results are shown in Table 5. There was also produced a membrane-electrode assembly for hydrogen fuel cell, in the same manner as in Example 1, and was evaluated for bonding property. A hydrogen fuel cell using the membrane-electrode assembly was evaluated for output voltage, durability, and bonding property after durability test. The results are shown in Table 6.

Comparative Example 4

A membrane for fuel cell was obtained in the same manner as in Example 10 except that the adhesive layer resin was changed to one shown in Table 4. The membrane for fuel cell was measured for anion-exchange capacity, water content, membrane resistance, membrane thickness and thickness of adhesive layer. The results are shown in Table 5. Further, a membrane-electrode assembly for direct methanol fuel cell was produced in the same manner as in Example 1. The membrane-electrode assembly was evaluated for bonding property. A direct methanol fuel cell using the membrane-electrode assembly was evaluated for output voltage, durability, and bonding property after durability test. The results are shown in Table 5. There was also produced a membrane-electrode assembly for hydrogen fuel cell, in the same manner as in Example 1, and was evaluated for bonding property. A hydrogen fuel cell using the membrane-electrode assembly was evaluated for output voltage, durability, and bonding property after durability test. The results are shown in Table 6.

The invention claimed is:

1. A membrane for polymer electrolyte fuel cell used for preparing a membrane-electrode assembly, which comprises:
   a hydrocarbon anion-exchange resin membrane wherein an anion-exchange group is covalently bonded to a hydrocarbon resin, and
   an adhesive layer used for bonding a catalyst electrode layer formed on at least one side of the hydrocarbon anion-exchange resin membrane,
   wherein the adhesive layer consist essentially of a hydrocarbon anion-exchange resin, which hydrocarbon anion-exchange resin is made of a styrene-based anion-exchange resin in which a quaternary ammonium salt group is covalently bonded to a non-crosslinked styrene-based elastomer, and has a Young's modulus of 1 to 1,000 MPa, and
   wherein the adhesive layer has a solubility of less than 1% by mass in water of 20° C. and has a thickness of 1 to 10 µm.

2. The membrane for direct liquid fuel cell according to claim 1, wherein the adhesive layer has a solubility of less than 1% by mass in methanol and ethanol of 20° C.

3. The membrane for polymer electrolyte fuel cell according to claim 1, wherein the styrene-based elastomer is a polystyrene-polyalkylene-polystyrene triblock copolymer.

4. The membrane for polymer electrolyte fuel cell according to claim 1, wherein the hydrocarbon anion-exchange resin membrane in which an anion-exchange group is covalently bonded to a hydrocarbon resin, comprises a porous membrane and a hydrocarbon anion-exchange resin filled in the pores of the porous membrane.

5. The membrane for polymer electrolyte fuel cell according to claim 1, wherein an intermediate layer made of a cation-exchange resin is present between the hydrocarbon anion-exchange resin membrane and the adhesive layer.

6. A membrane-catalyst electrode assembly which is obtained by forming a catalyst electrode layer on at least one side of a membrane for polymer electrolyte fuel cell, said membrane for polymer electrolyte fuel cell comprises,
   a hydrocarbon anion-exchange resin membrane wherein an anion-exchange group is covalently bonded to a hydrocarbon resin, and
   an adhesive layer used for bonding a catalyst electrode layer formed on at least one side of the hydrocarbon anion-exchange resin membrane,
   wherein the adhesive layer consist essentially of a hydrocarbon anion-exchange resin, which hydrocarbon anion-exchange resin is made of a styrene-based anion-exchange resin in which a quaternary ammonium salt group is covalently bonded to a non-crosslinked styrene-based elastomer, and has a Young' modulus of 1 to 1,000 MPa, and
   wherein the adhesive layer has a solubility of less than 1% by mass in water of 20° C. and has a thickness of 1 to 10 µm.

7. The membrane-catalyst electrode assembly according to claim 6, wherein in the membrane for polymer electrolyte fuel cell, an intermediate layer made of a cation-exchange resin is present between the hydrocarbon anion-exchange resin membrane and the adhesive layer.

8. A polymer electrolyte fuel cell which comprises a membrane-catalyst electrode assembly obtained by forming a catalyst electrode layer on at least one side of a membrane for polymer electrolyte fuel cell, said membrane for polymer electrolyte fuel cell comprises,
   a hydrocarbon anion-exchange resin membrane wherein an anion-exchange group is covalently bonded to a hydrocarbon resin, and
   an adhesive layer used for bonding a catalyst electrode layer formed on at least one side of the hydrocarbon anion-exchange resin membrane,
   wherein the adhesive layer consists essentially of a hydrocarbon anion-exchange resin, which hydrocarbon anion-exchange resin is made of a styrene-based anion-exchange resin in which a quaternary ammonium salt group is covalently bonded to a non-crosslinked styrene-based elastomer, and has a Young' modulus of 1 to 1,000 MPa, and
   wherein the adhesive layer has a solubility of less than 1% by mass in water of 20°C. and has a thickness of 1 to 10 µm.

9. The polymer electrolyte fuel cell according to claim 8, wherein in the membrane for polymer electrolyte fuel cell, an intermediate layer made of a cation-exchange resin is present between the hydrocarbon anion-exchange resin membrane and the adhesive layer.

* * * * *